(12) United States Patent
Nakagawa

(10) Patent No.: US 10,028,103 B2
(45) Date of Patent: Jul. 17, 2018

(54) POSITION MANAGEMENT SYSTEM, POSITION MANAGEMENT APPARATUS, POSITION MANAGEMENT METHOD, AND NON-TRANSITORY COMPUTER-READABLE INFORMATION RECORDING MEDIUM

(71) Applicant: Kenichi Nakagawa, Tokyo (JP)

(72) Inventor: Kenichi Nakagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 15/151,627

(22) Filed: May 11, 2016

(65) Prior Publication Data
US 2016/0337810 A1 Nov. 17, 2016

(30) Foreign Application Priority Data

May 13, 2015 (JP) .................... 2015-098298
May 13, 2015 (JP) .................... 2015-098299
(Continued)

(51) Int. Cl.
*H04W 4/00* (2018.01)
*H04W 4/02* (2018.01)
(Continued)

(52) U.S. Cl.
CPC ............ *H04W 4/04* (2013.01); *G01S 5/0252* (2013.01); *H04W 4/029* (2018.02); *H04W 4/043* (2013.01);
(Continued)

(58) Field of Classification Search
CPC ...... G01S 5/0252; G01S 5/0263; G01S 13/75; G01S 13/878; G01S 1/02; G01S 1/68;
(Continued)

(56) References Cited

U.S. PATENT DOCUMENTS 9,392,411 B1 7/2016 Al-Yousif
2004/0171373 A1 9/2004 Suda et al.
(Continued)

FOREIGN PATENT DOCUMENTS

JP 5225242 7/2013
JP 5257662 8/2013
(Continued)

OTHER PUBLICATIONS

Office Action dated Jun. 28, 2017 issued to related U.S. Appl. No. 15/140,713.

*Primary Examiner* — Erica Navar
(74) *Attorney, Agent, or Firm* — IPUSA, PLLC

(57) ABSTRACT

A position management system manages position information of a second apparatus which carries out wireless communications with a first apparatus that is installed indoors. The position management system determines radio field intensity of radio waves of the wireless communications that are received from the first apparatus when movement of the second apparatus is detected, acquires first position information that indicates a position of the second apparatus estimated based on the determined radio field intensity of the radio waves, and stores the acquired first position information associated with time information.

17 Claims, 29 Drawing Sheets

(30) Foreign Application Priority Data

| | | |
|---|---|---|
| May 13, 2015 | (JP) | 2015-098300 |
| May 13, 2015 | (JP) | 2015-098301 |
| May 13, 2015 | (JP) | 2015-098302 |

(51) Int. Cl.
*H04W 4/04* (2009.01)
*H04W 64/00* (2009.01)
*G01S 5/02* (2010.01)
*H04W 4/029* (2018.01)
*H04W 4/80* (2018.01)

(52) U.S. Cl.
CPC ........... *H04W 4/80* (2018.02); *H04W 64/006* (2013.01); *Y02D 70/10* (2018.01)

(58) Field of Classification Search
CPC ............ G01S 5/14; G01S 5/18; H04W 4/008; H04W 4/028; H04W 4/04; H04W 4/043; H04W 64/006; H04W 4/023; H04M 1/7253; H04M 2250/04; G06K 2017/0051
See application file for complete search history.

(56) References Cited

U.S. PATENT DOCUMENTS

| | | | |
|---|---|---|---|
| 2010/0090899 A1 | 4/2010 | Zhao et al. | |
| 2012/0122487 A1* | 5/2012 | Holm | G01C 21/206 455/456.2 |
| 2012/0223860 A1* | 9/2012 | Leclercq | G01S 19/34 342/357.63 |
| 2013/0342399 A1 | 12/2013 | Fukuda et al. | |
| 2014/0035724 A1 | 2/2014 | Rothschild | |
| 2014/0087710 A1 | 3/2014 | Kusakari et al. | |

FOREIGN PATENT DOCUMENTS

| | | |
|---|---|---|
| JP | 2014-025910 | 2/2014 |
| JP | 2014-077777 | 5/2014 |
| JP | 5602686 | 10/2014 |
| JP | 2014-217049 | 11/2014 |

* cited by examiner

34

| APPARATUS ID | INSTALLATION AREA ID |
|---|---|
| AP1 | A001 |
| AP2 | A001 |
| AP3 | A002 |
| ... | ... |

TAG ID:T002

TAG ID:T001

| DATE AND TIME | POSITION INFORMATION ||
|---|---|---|
| | AREA ID | COORDINATE INFORMATION |
| 2015/1/31 14:01:03 | A001 | $X_n, Y_n$ |
| 2015/1/31 14:01:02 | A001 | $X_{n-1}, Y_{n-1}$ |
| 2015/1/31 14:01:01 | A001 | $X_{n-2}, Y_{n-2}$ |
| ... | ... | ... |

| AREA ID | MAP DISPLAY DATA |
|---|---|
| A001 | FIRST FLOOR IN BUILDING X |
| A002 | SECOND FLOOR IN BUILDING X |
| A003 | FIRST FLOOR IN BUILDING Y |
| ... | ... |

| TAG ID | ARTICLE NAME |
|---|---|
| T001 | MOLD FOR ABC |
| T002 | MOLD FOR DEF |
| T003 | MOLD FOR XYZ |
| ... | ... |

| TAG ID | BATTERY REMAINING AMOUNT |
|---|---|
| T001 | 80% |
| T002 | 7% |
| T003 | 62% |
| ... | ... |

FIG.26

TAG ID:T002

TAG ID:T001

| | FIRST POSITION INFORMATION | | SECOND POSITION INFORMATION | | |
|---|---|---|---|---|---|
| DATE AND TIME | AREA ID | COORDINATE INFORMATION | LATITUDE AND LONGITUDE INFORMATION | FLOOR INFORMATION | |
| 2015/1/31 14:01:03 | A001 | $X_n, Y_n$ | $x_n, y_n$ | 1.0 | |
| 2015/1/31 14:01:02 | A001 | $X_{n-1}, Y_{n-1}$ | $x_{n-1}, y_{n-1}$ | 1.0 | |
| 2015/1/31 14:01:01 | A001 | $X_{n-2}, Y_{n-2}$ | $x_{n-2}, y_{n-2}$ | 1.0 | |
| ... | ... | ... | ... | ... | |

44A

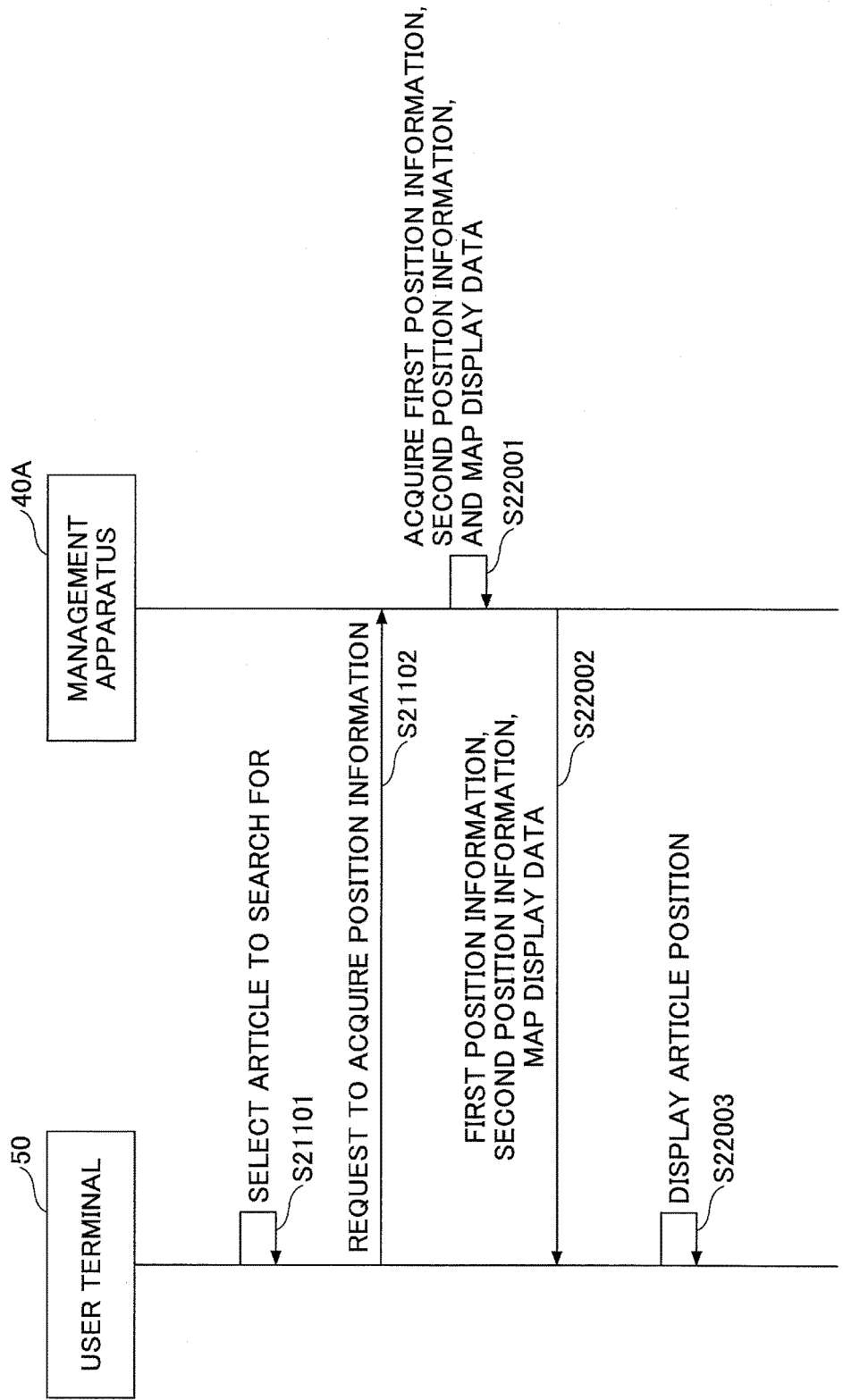

POSITION MANAGEMENT SYSTEM, POSITION MANAGEMENT APPARATUS, POSITION MANAGEMENT METHOD, AND NON-TRANSITORY COMPUTER-READABLE INFORMATION RECORDING MEDIUM

CROSS-REFERENCE TO APPLICATIONS

The present patent application is based on and claims the benefit of priority of Japanese Priority Application No. 2015-098298, filed on May 13, 2015, Japanese Priority Application No. 2015-098299, filed on May 13, 2015, Japanese Priority Application No. 2015-098300, filed on May 13, 2015, Japanese Priority Application No. 2015-098301, filed on May 13, 2015, and Japanese Priority Application No. 2015-098302, filed on May 13, 2015, the entire contents of which are hereby incorporated herein by reference.

BACKGROUND

1. Technical Field

The present invention relates to a position management system, a position management apparatus, a position management method, and a non-transitory computer-readable information recording medium.

2. Description of the Art

Technology is known with which radio waves received by a communication apparatus such as a wireless tag physically associated with an article are used and the position of the article indoors is estimated. Using such technology, for example, a user of the article such as an administrator acquires the position of the article such as an installation place, a storage place, or the like.

Also, technology is known with which a communication apparatus physically associated with an article determines position information which properly indicates the current position (for example, see Japanese Laid-Open Patent Application No. 2014-25910).

SUMMARY

According to one aspect, a position management system which manages position information of a second apparatus which carries out wireless communications with a first apparatus that is installed indoors. The position management system includes at least one processor that is configured to determine radio field intensity of radio waves of the wireless communications that are received from the first apparatus when movement of the second apparatus is detected, acquire first position information that indicates a position of the second apparatus that is estimated based on the determined radio field intensity of the radio waves, and store the acquired first position information associated with time information.

Other objects, features, and advantages will become more apparent from the following detailed description when read in conjunction with the accompanying drawings.

BRIEF DESCRIPTION OF THE DRAWINGS

FIG. 8 illustrates one example of a movement history information database;

FIG. 9 illustrates one example of a map information database;

FIG. 10 illustrates one example of an article information database;

FIG. 11 illustrates one example of a battery remaining amount information database;

FIG. 26 illustrates one example of a movement history information database that can be used in any one of the fourth through sixth embodiments of the present invention;

FIG. 33 is a sequence diagram of one example of a position information display process according to the sixth embodiment of the present invention.

DETAILED DESCRIPTION OF EMBODIMENTS

In the above-described technology, it may be difficult to acquire position information that indicates an article's current position if the article is moved to a place where transmission and/or reception of radio waves have a problem, or radio waves do not reach, for example. The radio wave condition may not be sufficient or radio waves may not reach for a communications apparatus physically associated with the article (for example, the communications apparatus is attached to the article) if the article is placed at an environment such as a factory where many metallic shields or the like are present, or the article is stored deep in a metallic shelf, for example. In such case, it is not possible to acquire the current position of the article.

An object of an embodiment of the present invention is to manage the current position of an apparatus even in an environment that includes many shields, for example.

Below, embodiments of the present invention will be described with reference to accompanying drawings.

First Through Third Embodiments

<System Configuration>

Figure 1:
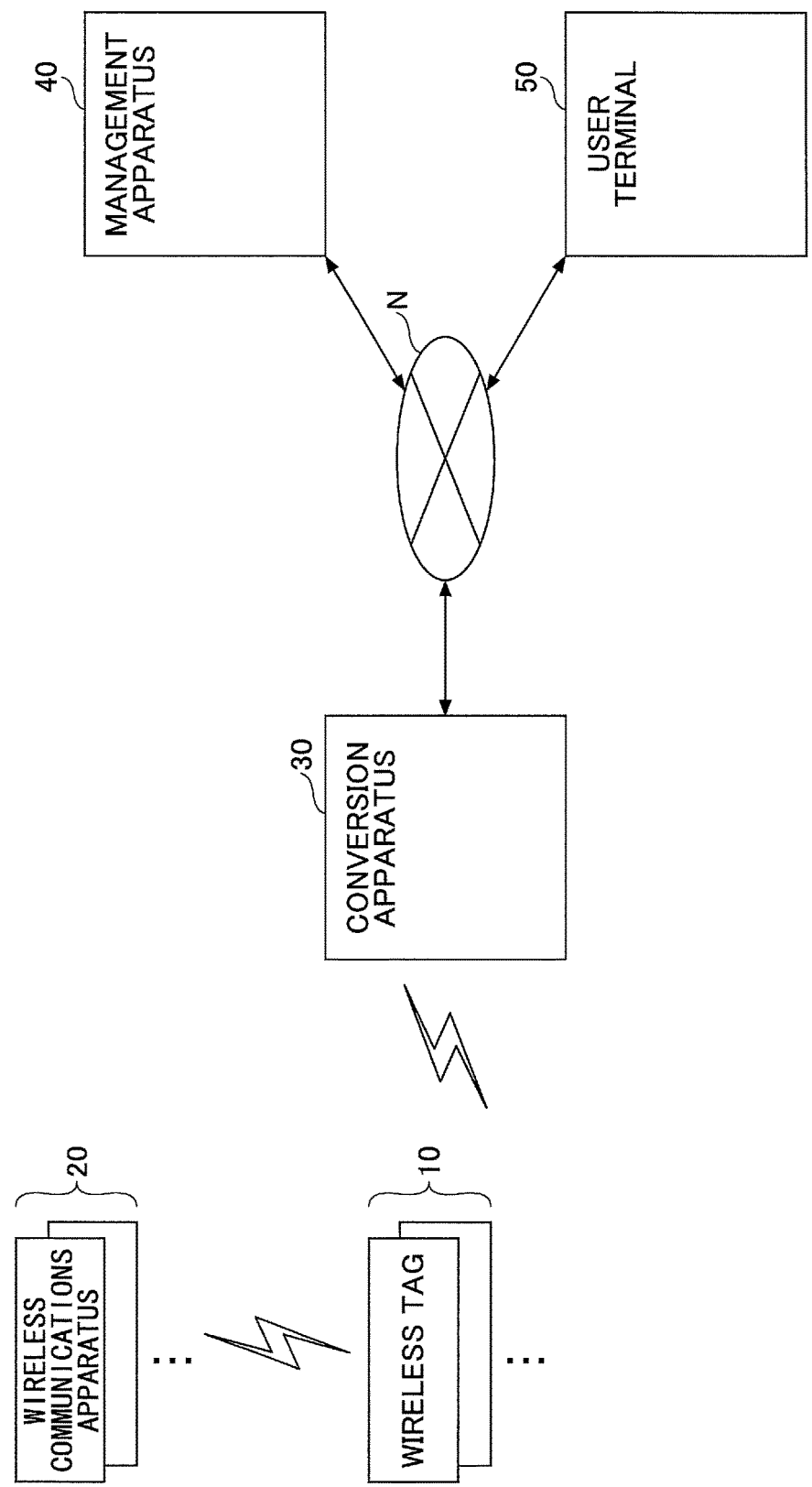
FIG. 1 is a system configuration diagram illustrating one example of position management systems that can be used in any one of first through third embodiments of the present invention.

First, a position management system 1 that can be used in any one of first through third embodiments of the present invention will be described with reference to FIG. 1. FIG. 1 is a system configuration diagram illustrating one example of position management system 1 that can be used in any one of the first through third embodiments of the present invention. The position management system 1 of FIG. 1 includes a wireless tag 10, a wireless communications apparatus 20, a conversion apparatus 30, a management apparatus 40, and a user terminal 50. The conversion apparatus 30, the management apparatus 40, and the user terminal 50 are connected via, for example, a network N such as the Internet, a telephone network, or the like, in such a manner that they can carry out communications therebetween.

The wireless tag 10 is an apparatus physically associated with (for example, attached to) each article to be managed, for which a position such as an installation place, a storage place, or the like, is managed. If the article with which the wireless tag 10 is physically associated is moved, the wireless tag 10 measures the radio field intensity of radio waves of wireless communications received from the wireless communications apparatus 20, and transmits information concerning the measured radio field intensity ("radio field intensity information") to the conversion apparatus 30.

The wireless communications apparatus 20 carries out wireless communications with the wireless tag 10, and so forth, according to a predetermined wireless communications standard. A plurality of the wireless communications apparatuses 20 are installed in rooms, on floors, and so forth (i.e., "areas" which will be described later) where the articles to manage are installed, or stored, for example, and transmit radio waves of wireless communications to a predetermined surrounding range at predetermined time intervals. As the predetermined wireless communications standard, any one of various wireless communications standards can be used, for example, ZigBee (registered trademark), RFID (Radio Frequency Identifier), Bluetooth (registered trademark), infrared rays, Wi-Fi (registered trademark), ultrasonic waves, or the like, can be used.

The conversion apparatus 30 is an information processing apparatus that converts the radio field intensity information received from the wireless tag 10 to position information. Thus, in the position management system 1, the conversion apparatus 30 acquires the position information of each article to manage. The conversion apparatus 30 transmits the position information acquired through the conversion to the management apparatus 40.

The management apparatus 40 is a storage apparatus or an information processing apparatus that manages the position information received from the conversion apparatus 30. The management apparatus 40 also manages information concerning maps of the rooms or the floors where the articles to be managed are installed or stored, for example, and transmits the information concerning the maps of the articles to the user terminal 50 in response to a request therefrom.

Further, the management apparatus 40 manages the remaining amount of a battery that is a power source included in the wireless tag 10. For example, if the battery remaining amount becomes equal to or below a predetermined value, the management apparatus 40 transmits a notification to the user terminal 50 to prompt replacement of the battery.

Note that the position management system 1 can use, instead of the management apparatus 40, for example, a cloud storage service provided by an external service provider, or the like, or can be in conformity with any one of various provisioning styles such as an ASP (Application Service Provider), a Web service, and so forth.

The user terminal 50 is an information processing apparatus that is used by a user for causing it to display the position of the article to be managed. The user terminal 50 displays the position of the article on the map by acquiring the position information and the information concerning the map for the article that the user wishes to search for. Thus, the user can acquire the article's installation place, storage place, or the like. As the user terminal 50, for example, a cellular phone, a smart phone, a tablet terminal, a notebook personal computer, a desktop personal computer, or the like, can be used.

Note that the configuration of the position management system 1 shown in FIG. 1 is one example, and the position management system 1 can have another configuration. For example, each of the conversion apparatus 30 and the management apparatus 40 can be implemented by a plurality of separate units, or the conversion apparatus 30 and the management apparatus 40 can be integrated in one unit.

<Hardware Configuration>

Next, the hardware configuration of the position management system 1 that can be used in any one of the first through third embodiments of the present invention will be described.

Figure 2:
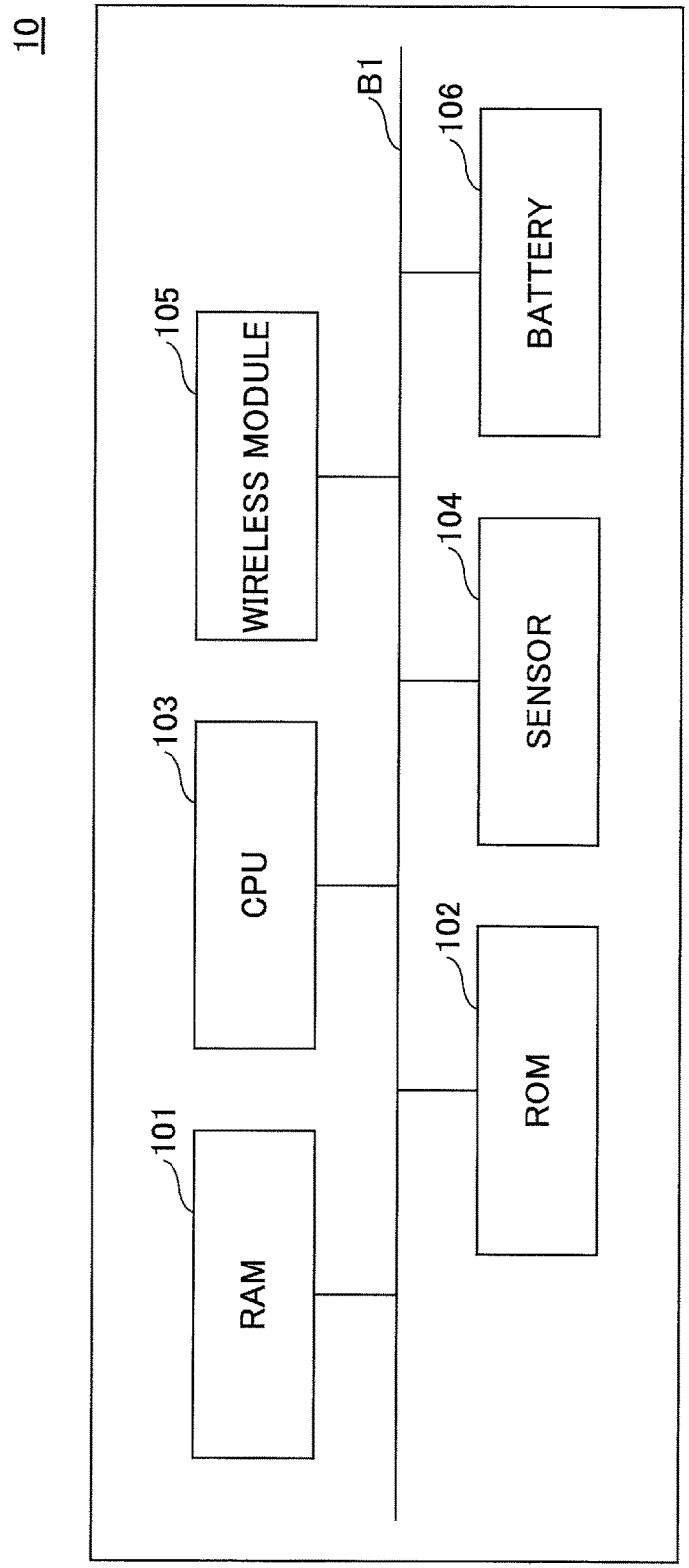
FIG. 2 is a hardware configuration diagram of one example of a wireless tag that can be used in any one of the first through third embodiments of the present invention.

First, the hardware configuration of the wireless tag 10 will be described with reference to FIG. 2. FIG. 2 is a hardware configuration diagram of one example of the wireless tag 10 that can be used in any one of the first through third embodiments of the present invention. The wireless tag 10 includes a RAM (Random Access Memory) 101, a ROM (Read-Only Memory) 102, a CPU (Central Processing Unit) 103, a sensor 104, a wireless module 105, and a battery 106, which are mutually connected via a bus B1.

The RAM 101 is a volatile semiconductor memory and temporarily stores programs and data. The ROM 102 is a nonvolatile semiconductor memory and can hold data even after the supply of power thereto is turned off. The CPU 103 is a processing unit, and, for example, reads programs or data from the ROM 102 to the RAM 101, and carries out various processes.

The sensor 104 includes various sensors such as, for example, an acceleration sensor, a gyro sensor, and/or the like, and detects that the article starts moving or is moving from a vibration of the article with which the wireless tag 10 is physically associated.

The wireless module 105 carries out wireless communications with the wireless communications apparatus 20 according to the predetermined wireless communications standard.

The battery 106 is a button battery, and supplies power to the respective hardware components. However, the battery 106 is not limited to a button battery. The battery 106 can be an AA cell battery, an AAA cell battery, a battery dedicated for the wireless tag 10, or the like.

The wireless tag 10 that can be used in any one of the first through third embodiments of the present invention can implement various processes which will be described later using the hardware configuration shown in FIG. 2.

Figure 3:
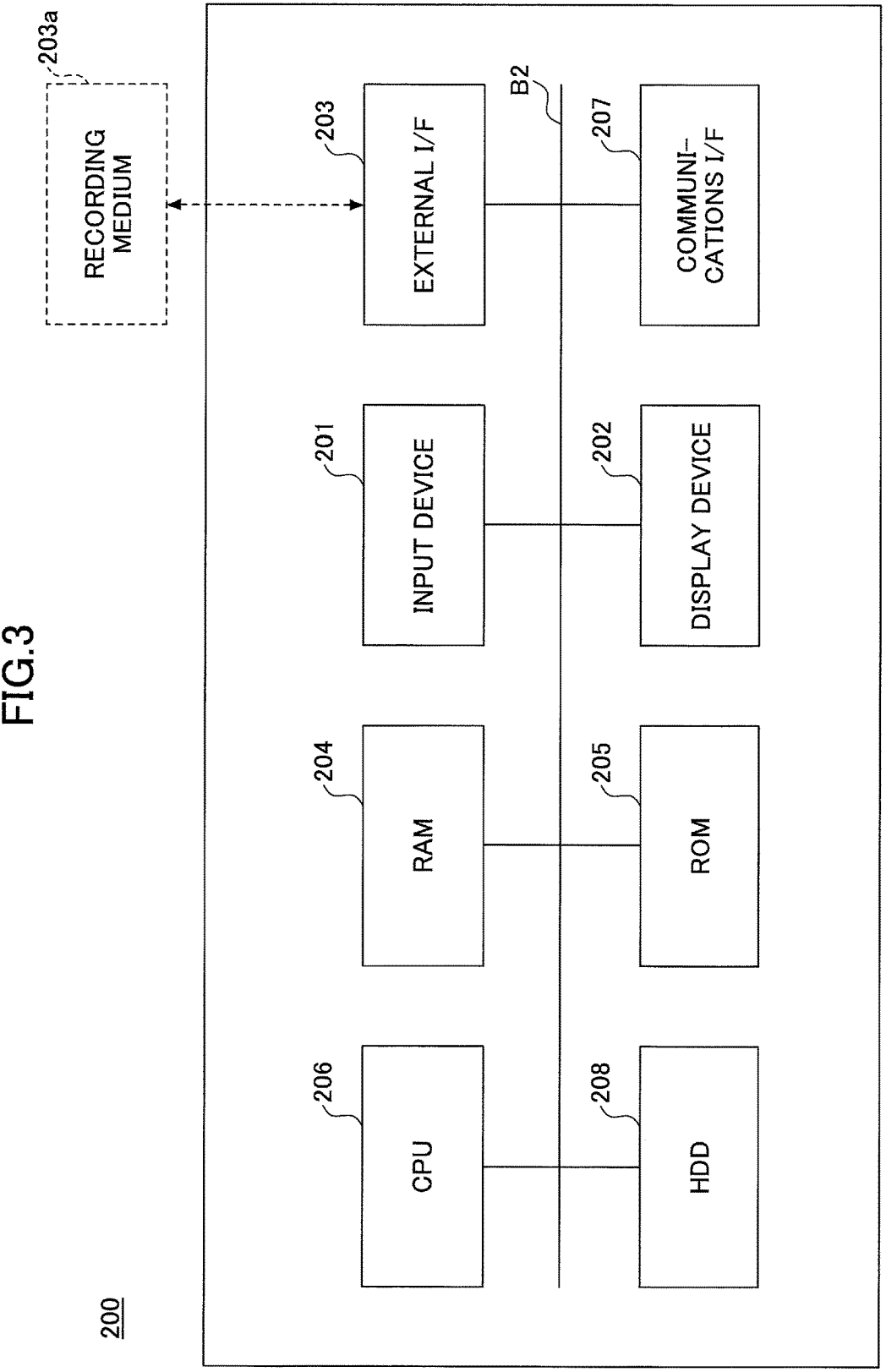
FIG. 3 is a hardware configuration diagram illustrating one example of computers that can be used in any one of the first through third embodiments of the present invention.

Next, a hardware configuration that can be used to any one of the conversion apparatus 30, the management apparatus 40, and the user terminal 50 will be described with reference to FIG. 3. FIG. 3 is a hardware configuration diagram illustrating one example of a computer that can be used in any one of the first through third embodiments of the present invention. The computer 200 includes an input device 201, a display device 202, an external I/F 203, a RAM 204, a ROM 205, a CPU 206, a communications I/F 207, and a HDD (Hard Disk Drive) 208. These devices are mutually connected via a bus B2.

The input device 201 includes a keyboard, a mouse, a touch panel, and/or the like, and is used to input various signals to the computer 200. The display device 202 includes a display, or the like, and displays various process results. Note that the conversion apparatus 30 and the management apparatus 40 can be configured in such a manner that they are connected to and use the input devices 201 and/or the display devices 202 only when the input devices 201 and/or the display devices 202 are actually needed.

The external I/F 203 is an interface for connecting to an external apparatus. The external apparatus can be a recording medium 203a, or the like. Thus, the computer 200 can read information from and/or write information to the recording medium 203a via the external I/F 203. The recording medium 203a can be, a CD (Compact Disk), a DVD (Digital Versatile Disk), a SD memory card, a USB memory (Universal Serial Bus memory), or the like.

The RAM 204 is a volatile semiconductor memory and temporarily stores programs and data. The ROM 205 is a nonvolatile semiconductor memory and can hold data even after the supply of power is turned off. The CPU 206 is a processing unit, and, for example, reads programs or data from the HDD 208, the ROM 205, or the like, to the RAM 204, and carries out various processes.

The communications I/F 207 is an interface for connecting the computer 200 to the network N. The communications I/F 207 of the conversion apparatus 30 includes a wireless module to carry out wireless communications with the wireless tag 10 and/or the wireless communications apparatus 20 according to the predetermined wireless communications standard.

The HDD 208 is a nonvolatile memory and stores programs and data. The programs and data include an OS (operating system) that is basic software to control the entirety of the computer 200, and various programs that operate under the control of the OS. Note that the computer 200 can have, instead of the HDD 208, for example, another nonvolatile memory such as a SSD (Solid State Drive).

The conversion apparatus 30, the management apparatus 40, and the user terminal 50 that can be used in any one of the first through third embodiments of the present invention implement various processes that will be described later as the computers 200 shown in FIG. 3.

<Use Situation>

Figure 4:
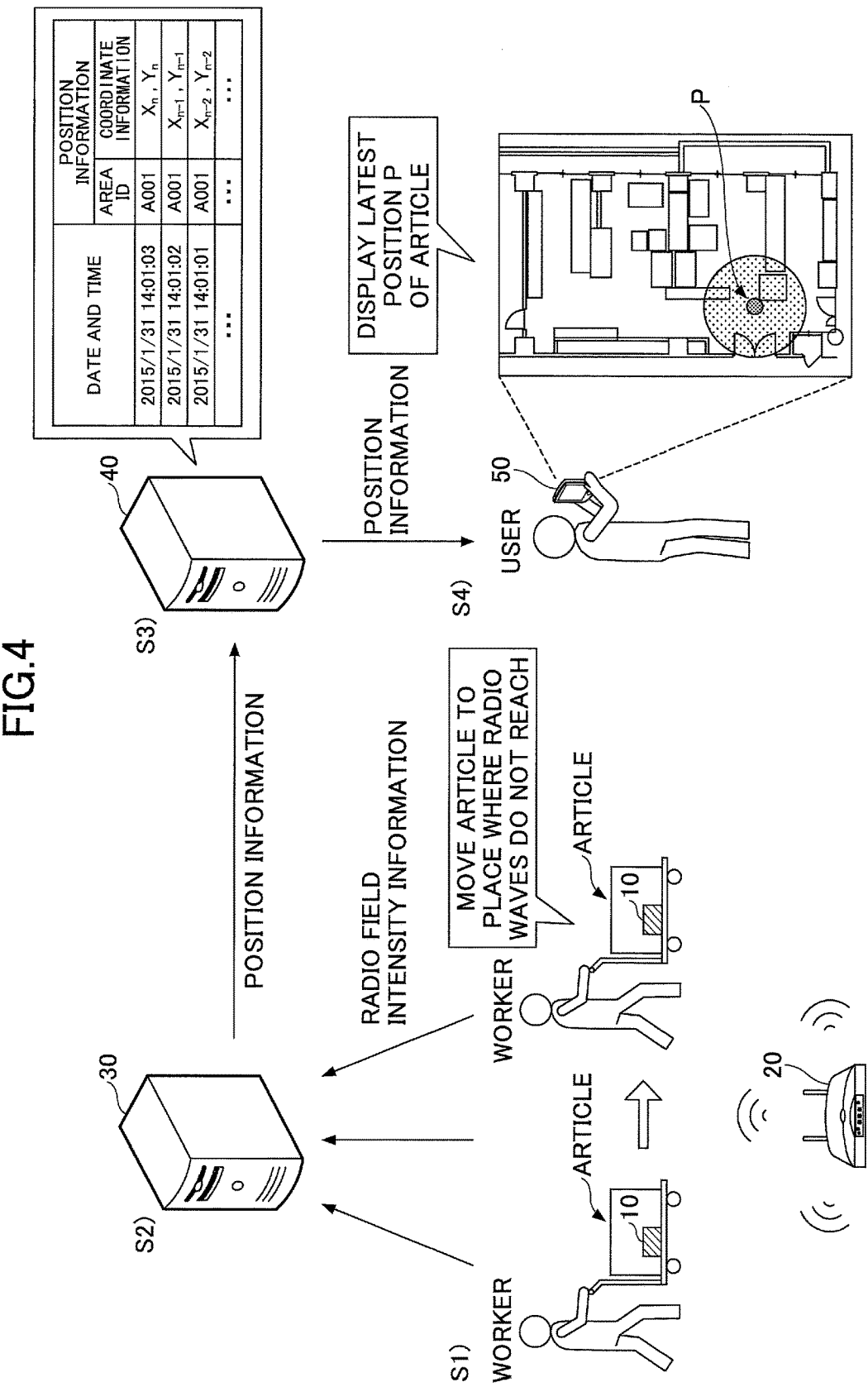
FIG. 4 illustrates a use situation in the position management system that can be used in any one of the first through third embodiments of the present invention.

Next, a use situation of the position management system 1 that can be used in any one of the first through third embodiments of the present invention will be described with reference to FIG. 4. FIG. 4 illustrates a use situation of the position management systems that can be used in any one of the first through third embodiments of the present invention.

The position management system 1 that can be used in any one of the first through third embodiments of the present invention is used for managing articles such as molds and/or various parts/components/equipment in a factory, for example. The articles to be managed have the wireless tags 10 physically associated therewith (for example, attached thereto), respectively. In one area that indicates a predetermined one section (for example, one room, one floor, or the like) of the factory, a plurality of the wireless communications apparatuses 20 are installed, and transmit radio waves of wireless communications at predetermined time intervals. At this time, a worker, or the like, of the factory, may move to store the article to be managed to a place where radio waves transmitted by the wireless communications apparatus 20 do not reach (for example, deep in a metallic shelf, or the like). Such a case will now be described.

S1) First, if the worker moves the article, the wireless tag 10 physically associated with the article detects the movement, and receives radio waves from a plurality of the wireless communications apparatuses 20. Then, the wireless tag 10 measures the radio field intensity of the received radio waves, and transmits the radio field intensity information to the conversion apparatus 30. Note that the wireless tag 10 receives the radio waves from the plurality of the wireless communications apparatuses 20, and transmits the radio field intensity information of the received radio waves to the conversion apparatus 30, at predetermined time intervals (for example, every several milliseconds, every several seconds, or so) during a period of time in which the article is moving.

S2) The conversion apparatus 30 acquires the position information of the wireless tag 10 based on the radio field intensity information received from the wireless tag 10. In other words, the conversion apparatus 30 converts the received radio field intensity information to the position information. Then, the conversion apparatus 30 transmits the acquired position information to the management apparatus 40. In the position management system 1, such a converting operation is carried out each time when the radio field intensity information is received. As a result, the position information (in other words, movement history information) can be acquired at predetermined time intervals, in a case where the article with which the wireless tag 10 is physically associated is moved. Note that the process of the conversion apparatus 30 transmitting the acquired position information to the management apparatus 40 can be carried out as a response to a query process carried out by the management apparatus 40 to the conversion apparatus 30.

S3) The management apparatus 40 stores the position information received from the conversion apparatus 30 in a storage area. Thus, the management apparatus 40 manages the movement history information of the wireless tag 10.

S4) The user who wishes to acquire the article position operates the user terminal 50, and acquires the latest position information of the corresponding wireless tag 10 physically associated with the article from the movement history information of the wireless tag 10 managed by the management apparatus 40. Then, the user terminal 50 can see the article position by causing the user terminal 50 to display the position P on a map based on the acquired position information.

Thus, according to the position management system 1 that can be used in any one of the first through third embodiments of the present invention, in response to a detection of movement of the article, the history of the position information ("movement history information") based on radio field intensity information of the radio waves received by the wireless tag 10 is managed. Therefore, for example, even if the article is stored at a place such as a place deep in a metallic shelf, or the like, where the radio waves do no reach, the position information of the storage place (or near the storage place) can be managed. Also, the user who wishes to know the article's storage place, or the like, can know it by acquiring the latest position information of the desired article from the management apparatus 40 using the user terminal 50.

<Functional Configuration>

Figure 5:
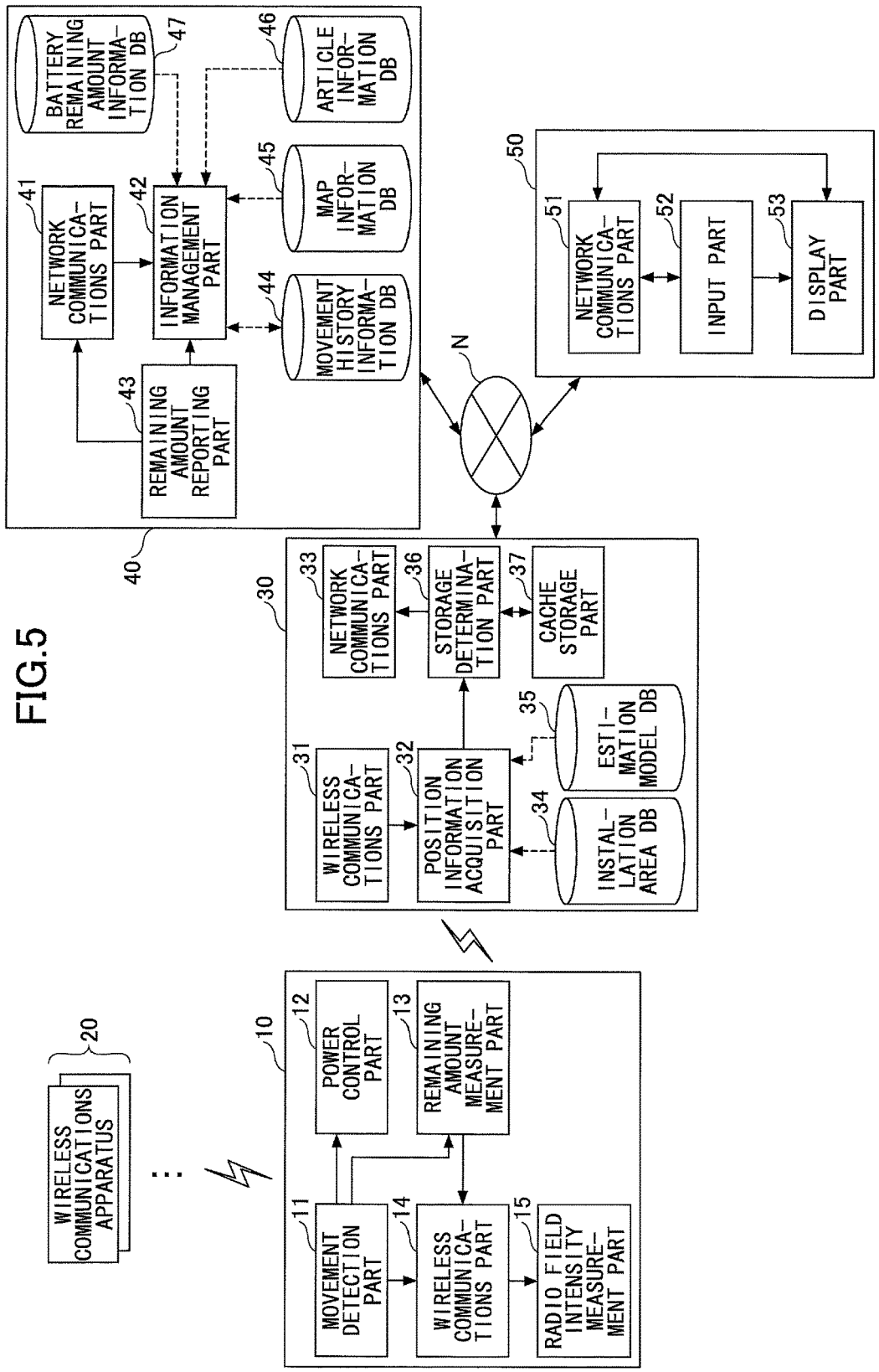
FIG. 5 is a functional configuration diagram illustrating one example of the position management systems that can be used in any one of the first through third embodiments of the present invention.

Next, the functional configuration of the position management system 1 that can be used in any one of the first through third embodiments of the present invention will be described with reference to FIG. 5. FIG. 5 is a functional configuration diagram illustrating one example of the position management system that can be used in any one of the first through third embodiments of the present invention. The wireless tag 10 includes a movement detection part 11, a power control part 12, a remaining amount measurement part 13, a wireless communications part 14, and a radio field intensity measurement part 15.

The movement detection part 11 is implemented by, for example, the CPU 103, the sensor 104, and so forth, and detects that the article with which the wireless tag 10 is physically associated starts moving or is moving.

The power control part 12 is implemented by, for example, the CPU 103, and so forth, and controls the power state of the wireless tag 10 based on the detection result of the movement detection part 11. Note that the power states of the wireless tag 10 include a standby state where no power is supplied to the wireless module 105 from the battery 106, and a working state where power is supplied to the wireless module 105 from the battery 106. The power control part 12 that can be used in any one of the first through third embodiments of the present invention changes the power state of the wireless tag 10 between the standby state and the working state based on the detection result of the movement detection part 11.

Figures 6, 7:
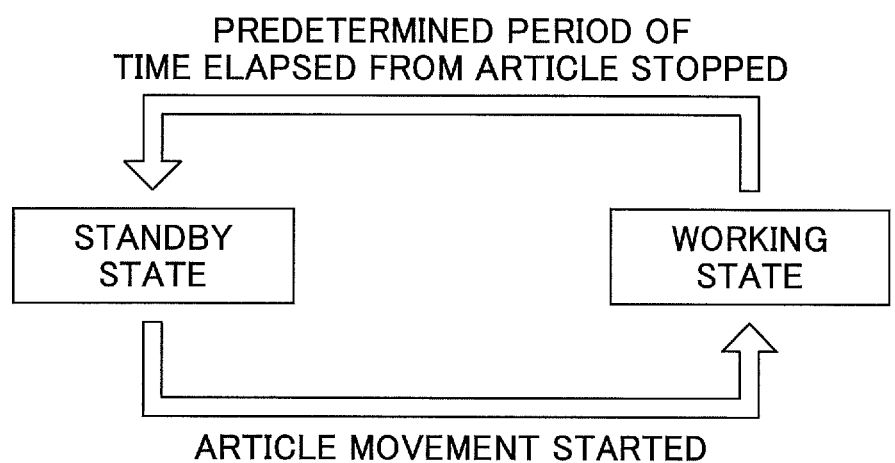
FIG. 6 illustrates one example of transition of a power state of a wireless tag.
FIG. 7 illustrates one example of an installation area database.

The transition of the power state by the power control part 12 will now be described with reference to FIG. 6. FIG. 6 illustrates one example of the transition of the power state of the wireless tag 10. As shown in FIG. 6, when the wireless tag 10 is in the standby state, the power control part 12 changes the power state of the wireless tag 10 from the standby state to the working state when the movement detection part 11 detects that the article starts moving.

When the wireless tag 10 is in the working state, the power control part 12 changes the power state of the wireless tag 10 from the working state to the standby state if a predetermined period of time elapses in a state where the movement detection part 11 cannot detect movement of the article (in other words, the article has been stopped). Thus, the wireless tag 10 that can be used to any one of the first through third embodiments of the present invention stops supplying power to the wireless module 105 from the battery 106 during a period of time during which the article is not moved. Thus, it is possible to reduce power consumption in the wireless module 105, and it is possible to prolong the life of the battery 106.

The remaining amount measurement part 13 is implemented by, for example, the CPU 103, and so forth, and measures the remaining amount of the power of the battery 106 to generate battery remaining amount information when the movement detection part 11 detects that the article starts moving.

The wireless communications part 14 is implemented by, for example, the CPU 103, the wireless module 105, and so forth, and carries out wireless communications with the wireless communications apparatus 20, and so forth.

The radio field intensity measurement part 15 is implemented by, for example, the CPU 103, the wireless module 105, and so forth, and measures the radio field intensity of radio waves of wireless communications received from the wireless communications part 14 to generate radio field intensity information.

The conversion apparatus 30 includes a wireless communications part 31, a position information acquisition part 32, a network communications part 33, an installation area database 34, an estimation model database 35, a storage determination part 36, and a cache storage part 37.

The wireless communications part 31 is implemented by, for example, the CPU 206, the communications I/F 207, and so forth, carries out wireless communications with the wireless tag 10 or the wireless communications apparatus 20, and receives the radio field intensity information or the battery remaining amount information.

The position information acquisition part 32 is implemented by, for example, the CPU 206, and so forth, and acquires the position information based on the radio field intensity information received from the wireless communications part 31, installation area information stored in the installation area database 34, and an estimation model stored in the estimation model database 35.

The network communications part 33 is implemented by, for example, the CPU 206, the communications I/F 207, and so forth, and transmits the position information acquired by the position information acquisition part 32 (depending on the determination result of the storage determination part 36, if necessary) or the battery remaining amount information received from the wireless communications part 31 to the management apparatus 40 via the network N.

The installation area database 34 is implemented by, for example, the HDD 208, or a storage apparatus that is connected with the conversion apparatus 30 via a network, and stores the installation area information. Details of the installation area information will be described later.

The estimation model database 35 is implemented by, for example, the HDD 208, or a storage apparatus that is connected with the conversion apparatus 30 via a network, and stores the estimation model that is used to estimate the position information of the wireless tag 10 based on the radio field intensity information. The estimation model is, for example, a radio field intensity distance attenuation model for estimating position information at a position at which the radio field intensity is measured generated as a result of information of radio intensity at a plurality of positions being previously learned through a learning device using a machine learning algorithm such as a Random Forest, a Support Vector Machine, or the like.

The storage determination part 36 is implemented by, for example, the CPU 206, and so forth, and determines, based on the position information stored in the cache storage part 37, whether to store the position information acquired by the position information acquisition part 32 in the management apparatus 40.

The cache storage part 37 is implemented by, for example, the HDD 208 or a storage apparatus connected with the conversion apparatus 30 via a network, and stores the position information as a cache to be used by the storage determination part 36 for the determination. Hereinafter, the position information stored in the cache storage part 37 will be referred to as "cached position information" for distinguishing from the position information acquired by the position information acquisition part 32.

The management apparatus 40 includes a network communications part 41, an information management part 42, a remaining amount reporting part 43, a movement history information database 44, a map information database 45, an article information database 46, and a battery remaining amount information database 47.

The network communications part 41 is implemented by, for example, the CPU 206, the communications I/F 207, and so forth, and receives the position information or the battery remaining amount information from the conversion apparatus 30 via the network N. Also, the network communications part 41 receives an article position information acquisition request, or the like, from the user terminal 50 via the network N.

The information management part 42 is implemented by, for example, the CPU 206, and so forth, and reads information from the various databases and writes (stores) information in the various databases. For example, if the network communications part 41 receives the article position information acquisition request from the user terminal 50, the information management part 42 acquires the article's latest position information from the movement history information database 44 in response to the article position information acquisition request.

The remaining amount reporting part 43 is implemented by, for example, the CPU 206, and so forth, and acquires the battery remaining amount information having the battery remaining amount equal to or below a predetermined threshold from the battery remaining amount information stored in the remaining amount information database 47. Then, the remaining amount reporting part 43 transmits the acquired battery remaining amount information to the predetermined user terminal 50.

The movement history information database 44, the map information database 45, the article information database 46, and the battery remaining amount information database 47 are implemented by, for example, the HDD 208 or a storage apparatus that is connected with the management apparatus 40 via a network, and stores the movement history information, the map information, the article information, and the battery remaining amount information, respectively. The movement history information, the map information, the article information, and the battery remaining amount information will be described later in detail.

The user terminal 50 includes a network communications part 51, an input part 52, and a display part 53.

The network communications part 51 is implemented by, for example, the CPU 206, the communications I/F 207, and so forth, and transmits the article position information acquisition request to the management apparatus 40 via the network N. Also, the network communications part 51 receives the article position information, transmitted from the management apparatus 40 in response to the article position information acquisition request, or the like.

Also, the network communications part 51 receives the battery remaining amount information transmitted from the management apparatus 40.

The input part 52 is implemented by, for example, the CPU 206, the input device 201, and so forth, and receives an input from the user. For example, the input part 52 receives a designation of the article (the position of which is to be displayed) that is input from the input device 201.

The display part 53 is implemented by, for example, the CPU 206, the display device 202, and so forth, and displays the position based on the article position information on a map based on the information concerning the map if the network communications part 51 receives the article position information and information concerning the map.

Also, if the network communications part 51 receives the battery remaining amount information, the display part 53 displays the battery remaining amount based on the battery remaining amount information of the battery included in the wireless tag 10.

The installation area information stored in the installation area database 34 will now be described with reference to FIG. 7. FIG. 7 illustrates one example of the installation area database. The installation area information is information for managing the areas where the wireless communications apparatuses 20 are installed, and has data items of an apparatus ID and an installation area ID. The apparatus ID is identification information for uniquely identifying the wireless communications apparatus 20. The installation area ID is identification information for identifying, for example, one area that indicates predetermined one section in the factory.

For example, in FIG. 7, the apparatus IDs "AP1" and "AP2" are associated with the installation area IDs "A001". This means that in the area of the installation area ID "A001", the two wireless communications apparatuses 20 of the apparatus IDs "AP1" and "AP2" are installed. Thus, in the installation area information stored in the installation area database 34, the areas where the wireless communications apparatuses 20 are installed are managed.

Next, the movement history information stored in the movement history information database 44 will be described with reference to FIG. 8. FIG. 8 illustrates one example of the movement history information database. The movement history information is information for managing the history of the position information of the wireless tag 10 at time intervals, and has data items of, for each tag ID, date and time and position information. The tag ID is identification information for uniquely identifying the wireless tag 10. The date and time is information concerning, for example, the date and time at which the wireless tag 10 transmits the radio field intensity information to the conversion apparatus 30. The position information includes the area ID and coordinates information. The area ID is identification information for identifying one area that indicates predetermined one section in the factory in the same way as the installation area ID described above concerning FIG. 7. The information of the section areas managed by the area ID and the installation area ID can be the section area information concerning the same section dividing manner, or can be the section area information concerning different section dividing manners. The coordinate information indicates a coordinate of a position in the area of the corresponding area ID. The coordinate is the relative coordinate from a predetermined reference point in the area identified by the area ID.

For example, in FIG. 8, the position information at the date and time "2015/1/31 14:01:02" of the wireless tag 10 of tag ID "T001" is identified by the area ID "A001" and "Xn−1, Yn−1". In the same way, the position information at the date and time "2015/1/31 14:01:03" of the wireless tag 10 of tag ID "T001" is identified by the area ID "A001" and "Xn, Yn". Thus, in the movement history information stored in the movement history information database. 44, the movement history information of the wireless tag 10 (in other words, the movement history information of the article with which the wireless tag 10 is physically associated) is managed. Note that in FIG. 8, the date and time are expressed as year/month/day, and hour:minute:second. However, in addition thereto, it is possible to manage the date and time further, for example, in the order of a thousandth of a second (milliseconds).

Next, the map information stored in the map information database 45 will be described with reference to FIG. 9. FIG. 9 illustrates one example of the map information database. The map information is information for managing map display data of the area identified by the area ID, and has data items of the area ID and the map display data. The area ID is the same as that described above concerning FIG. 8. The map display data is the above-described information concerning the map, and is data for displaying the map of the area identified by the corresponding area ID. The map display data can be data of a raster type such as JPEG (Joint Photographic Experts Group), BMP (Bit Map), PNG (Portable Network Graphics), or the like, and also, can be data of a vector type.

For example, in FIG. 9, the area ID "A001" is associated with the map display data "first floor in building X". This means that the map of the area ID "A001" is displayed by the map display data "first floor in building X".

Next, the article information stored in the article information database 46 will be described with reference to FIG. 10. FIG. 10 illustrates one example of the article information database. The article information is information for associating the wireless tags 10 with the articles, respectively, and managing them, and has data items of the tag ID and the article name. The tag ID is identification information for uniquely identifying the wireless tag 10. The article name is the name of the article with which the wireless tag 10 of the corresponding tag ID is physically associated (for example, to which the wireless tag of the corresponding tag ID is attached to).

For example, in FIG. 10, the wireless tag 10 of the tag ID "T001" is associated with the article name "mold for ABC". This means that the wireless tag 10 of the tag ID "T001" is physically associated with (for example, is attached to) the "mold for ABC". Note that in FIG. 10, the article information can include, instead of or in addition to the data item "article name", a data item of "article ID", or the like, for uniquely identifying the article.

Next, the battery remaining amount information stored in battery remaining amount information database 47 will be described with reference to FIG. 11. FIG. 11 illustrates one example of the battery remaining amount information database. The battery remaining amount information is information for managing the remaining amount of the battery included in the wireless tag 10, and has data items of the tag ID and the battery remaining amount. The tag ID is, as described above, identification information for uniquely identifying the wireless tag 10. The battery remaining amount is the remaining amount of the battery included in the wireless tag 10 of the corresponding tag ID.

For example, in FIG. 11, the wireless tag 10 of the tag ID "T001" is associated with the battery remaining amount "80%". This means that the remaining amount of the battery included in the wireless tag 10 of the tag ID "T001" is "80%".

The functional configuration of the position management system 1 that can be used in any one of the first through third embodiments of the present invention has been described with reference to FIG. 5 and so forth. However, embodiments of the present invention are not limited thereto. For example, the functional configuration of the position management system 1 can differ among the first through third embodiments of the present invention. For example, the functional configurations of the respective position management systems according to the first through third embodiments of the present invention can be specialized for the corresponding embodiments of the present invention, respectively. That is, the functional configurations of the respective position management systems according to the first through third embodiments of the present invention can include only the parts/components necessary for carrying out the processes that will be described below separately for the first through third embodiments of the present invention. For example, the power control part 12 and the remaining amount measurement part 13 can be omitted from the wireless tags 10 according to the first and third embodiments of the present invention.

Process Detail of First Embodiment

Next, processes in the position management system 1 according to the first embodiment of the present invention will be described in detail.

Figure 12:
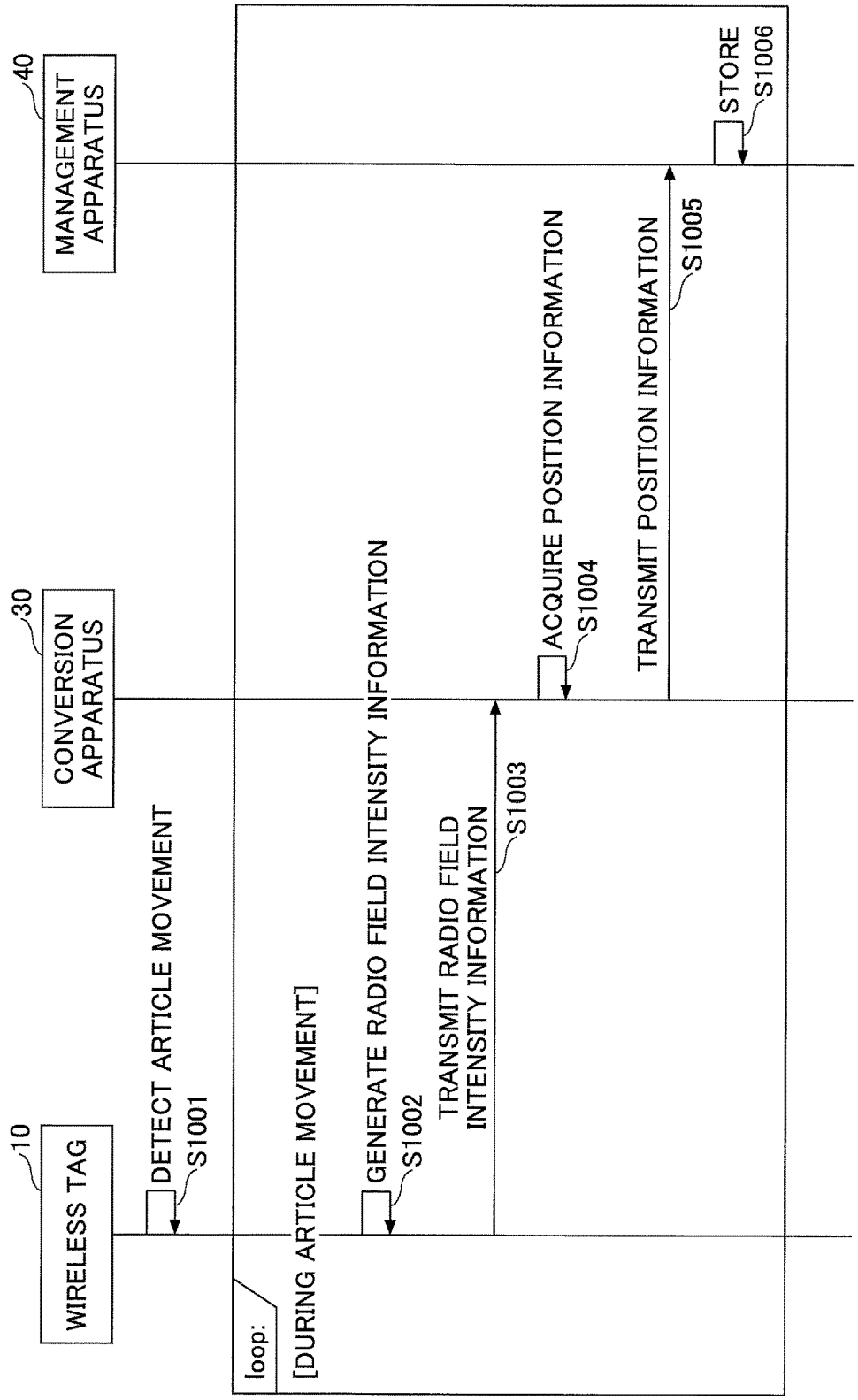
FIG. 12 is a sequence diagram illustrating one example of a movement history information storage process according to the first embodiment of the present invention.

First, a process of storing movement history information of an article in the management apparatus 40 in a case where, for example, a worker in a factory, or the like, moves the article with which the wireless tag 10 is physically associated (for example, to which the wireless tag 10 is attached) will be described with reference to FIG. 12. FIG. 12 is a sequence diagram illustrating one example of the movement history information storage process according to the first embodiment of the present invention.

The worker, or the like, starts moving the article with which the wireless tag 10 is physically associated. As a result, the movement detection part 11 of the wireless tag 10 detects that the article starts moving (step S1001). At this time, the wireless tag 10 starts supplying power to the wireless module 105 from the battery 106 in response to the detection by the movement detection part 11. The wireless communications part 14 then receives the radio waves of wireless communications transmitted from the wireless communications apparatus 20. Thus, power is supplied to the wireless module 105 of the wireless tag 10 in response to the detection by the movement detection part 11. As a result, it is possible to reduce power consumption in the wireless module 105.

Next, the radio field intensity measurement part 15 of the wireless tag 10 measures the radio field intensity of the radio waves received by the wireless communications part 14, and generates corresponding radio field intensity information (step S1002). At this time, the wireless communications part 14 receives a plurality of sets of the radio waves transmitted from a plurality of the wireless communications apparatuses 20, and the radio field intensity measurement part 15 measures the radio field intensity of the respective sets of the radio waves, and generates the corresponding sets of radio field intensity information. In other words, the radio field intensity information generated by the radio field intensity measurement part 15 includes the plurality of sets each of which includes the apparatus ID and the radio field intensity. For example, the radio field intensity information includes a plurality of sets of the apparatus IDs the and radio field intensity values such as (apparatus ID, radio field intensity value)=(AP1, 50), (AP2, 60), and so forth. Also, the radio field intensity information can include the date and time information (i.e., information concerning the date and the time) at which the radio field intensity measurement part 15 generates the corresponding set of radio field intensity information.

Next, the wireless communications part 14 of the wireless tag 10 transmits the radio field intensity information generated by the radio field intensity measurement part 15 to the conversion apparatus 30 (step S1003). Note that the wireless communications part 14 can transmit the radio field intensity information directly to the conversion apparatus 30 or can transmit the radio field intensity information to the conversion apparatus 30 through one or more of the wireless communications apparatuses 20.

For example, if the wireless tag 10 and the conversion apparatus 30 are apart from one another by such a distance that they cannot directly carry out wireless communications with one another, the wireless communications part 14 of the wireless tag 10 transmits the radio field intensity information to a nearby wireless communications apparatus 20. Then, if the nearby wireless communications apparatus 20 can directly transmit the information to the conversion apparatus 30, it transmits the radio field intensity information to the conversion apparatus 30. If the nearby wireless communications apparatus 20 cannot directly transmit the information to the conversion apparatus 30, it transmits the radio field intensity information to another wireless communications apparatus 20. In such a way, the wireless communications part 14 of the wireless tag 10 can transmit the radio field intensity information to the conversion apparatus 30 through one or more wireless communications apparatuses 20 which relay the information.

In the conversion apparatus 30, after the wireless communications part 31 receives the radio field intensity information, the position information acquisition part 32 acquires the position information based on the radio field intensity information, the installation area information, and the estimation model (step S1004).

More specifically, the position information acquisition part 32 reads the installation area information, and converts the apparatus ID of the wireless communications apparatus 20 included in the radio field intensity information to the installation area ID. In other words, the position information acquisition part 32 converts the apparatus ID and the radio field intensity value included in each set of radio field intensity information into the installation area ID and the radio field intensity value, respectively. Then, the position information acquisition part 32 estimates the position information of the wireless tag 10 based on the respective sets each including the installation area ID and the radio field intensity value as well as the estimation model, and thus acquires the estimated position information. The thus acquired position information includes, as described above, the area ID and the coordinate (i.e., the relative coordinate) information with respect to the reference position in the area identified by the area ID. In such a way, the conversion apparatus 30 converts the radio field intensity information to the position information.

Note that, according to the first embodiment, the apparatus ID of the wireless communications apparatus 20 is converted into the installation area ID in step S1004. However, this conversion process can be carried out in step S1006 that will be described later. In other words, in step S1004, the position information acquisition part 32 can estimate the position information of the wireless tag 10 based on the respective sets each including the apparatus ID and the radio field intensity value and the estimation model, and acquire the estimated position information.

Then, the network communications part 33 of the conversion apparatus 30 transmits the acquired position information to the management apparatus 40 via the network N (step S1005).

In the management apparatus 40, after the network communications part 41 receives the position information from the conversion apparatus 30, the information management part 42 associates the position information with the corresponding date and time information, and stores the position information in the movement history information database 44 as the movement history information (step S1006). At this time, the date and time with which the position information is associated can be the date and time at which the wireless tag 10 transmits the radio field intensity information. However, embodiments of the present invention are not limited thereto. For example, the date and time at which the management apparatus 40 receives the position information from the conversion apparatus 30 can be associated with the position information, and the position information can be stored as the movement history information.

Steps S1002 to S1006 described above are carried out at predetermined time intervals (for example, every several milliseconds, every several seconds, or so) while the article with which the wireless tag 10 is physically associated is being moved by the worker or the like. In other words, Steps S1002 to S1006 are carried out at predetermined time intervals while the movement detection part 11 of the wireless tag 10 physically associated with the article is detecting that the article is moving.

In such a way, even if the article is moved to a place where the radio waves do not reach (for example, deep in a metal shelf), the management apparatus 40 manages the movement history information until the time immediately before the wireless tag 10 becomes not able to receive the radio waves. Note that the wireless tag 10 stops supplying power to the wireless module 105 from the battery 106 after a predetermined period of time (for example, 60 seconds) elapses in a state where the movement detection part 11 cannot detect movement of the article (i.e., cannot detect that the article starts moving, is moving, or the like). As a result, after the predetermined period of time elapses from when the article is stopped, for example, the wireless communications part 14 stops receiving the radio waves of wireless communications transmitted from the wireless communications apparatus 20.

Figure 13:
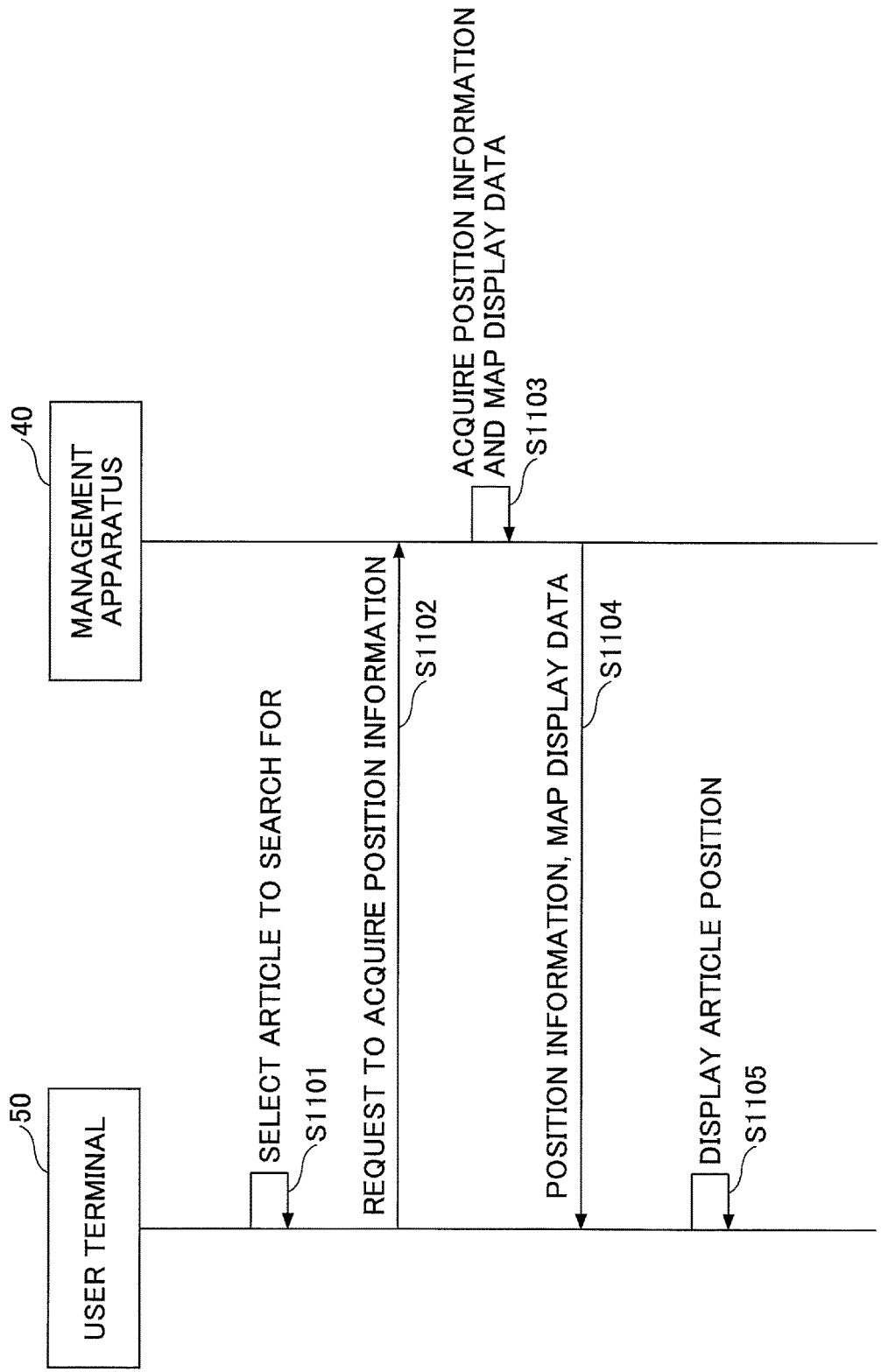
FIG. 13 is a sequence diagram illustrating a position information display process according to the first embodiment of the present invention.

Next, a process for the user to cause the user terminal 50 to display the position such as the place where the article is stored will be described with reference to FIG. 13. FIG. 13 is a sequence diagram illustrating the position information display process according to the first embodiment of the present invention.

Figure 14:
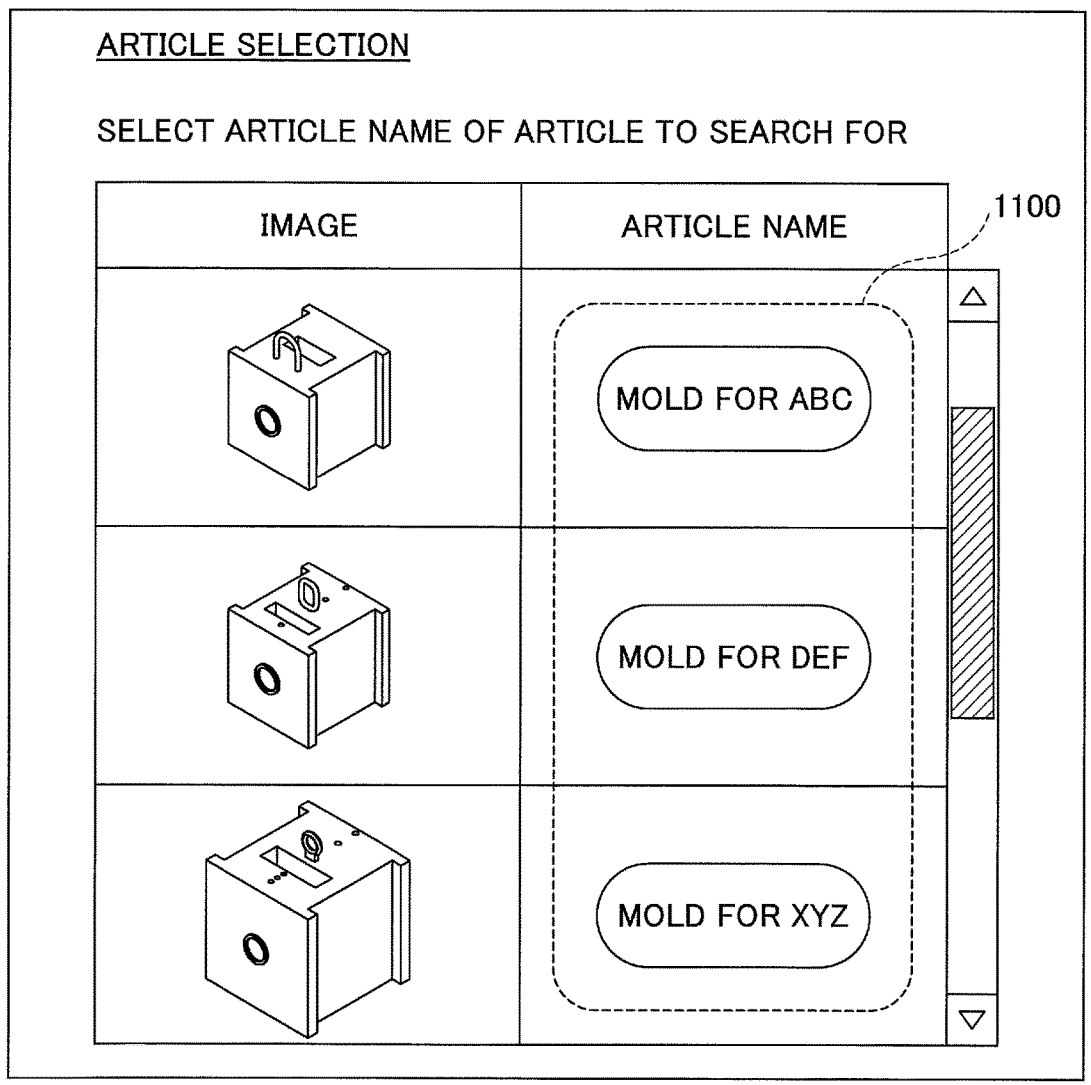
FIG. 14 illustrates one example of an article selection screen page.

First, the user operates the user terminal 50, and, for example, causes it to display the article selection screen page 1000 shown in FIG. 14 on the display device 202. Then, the user selects the article to search for (in other words, the article for which the current position is to be displayed) from the article selection screen page 1000 (step S1101). This process can be implemented as a result of, for example, the user selecting the desired article name from among the article name list 1100 displayed in the article selection screen page 1000.

Next, in the user terminal 50, after the input part 52 receives the selection of the article name, the network communications part 51 transmits a position information acquisition request for the article having the selected article name to the management apparatus 40 (step S1102). The position information acquisition request includes the selected article name. Note that the position information acquisition request can include, instead of the article name, the article ID for uniquely identifying the article of the selected article name.

In the management apparatus 40, after the network communications part 41 receives the position information acquisition request, the information management part 42 acquires the corresponding position information and map display data (step S1103). In other words, first, the information management part 42 acquires the tag ID associated with the article name from the article information stored in the article information database 46. Next, the information management part 42 acquires the latest position information (i.e., the position information having the most recent date and time) associated with the acquired tag ID from the movement history information stored in the movement history information database 44. Finally, the information management part 42 acquires the map display data associated with the area ID included in the acquired position information from the map information stored in the map information database 45. In such a way, the information management part 42 acquires the latest position information of the article having the article name selected by the user as well as the map display data for displaying the map of the area.

Then, the network communications part 41 of the management apparatus 40 transmits the position information and the map display data acquired by the information management part 42 to the user terminal 50 (step S1104). Note that, at this time, the network communications part 41 of the management apparatus 40 transmits error information that indicates an error in the position information acquired by the information management part 42 to the user terminal 50. Such error information can be acquired as a value that is, for example, previously determined by the administrator of the position management system 1, or the like, based on the estimation accuracy of the estimation model stored in the estimation model database 35, the standards of wireless communications used by the wireless communications apparatus 20, and/or the like.

Figure 15:
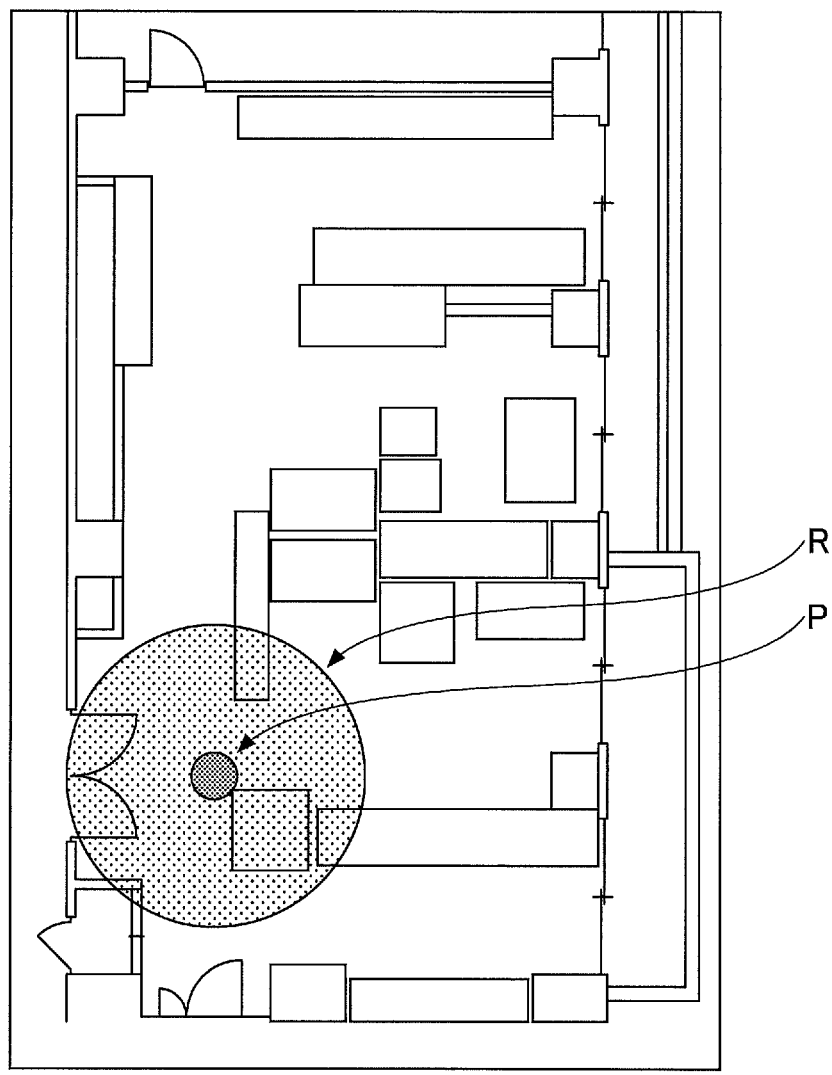
FIG. 15 illustrates one example of an article position display screen page.

Finally, in the user terminal 50, after the network communications part 51 receives the position information and the map display data, the display part 53 causes, for example, an article position display screen page 2000 shown in FIG. 15, to be displayed on the display device 202 (step S1105). In the article position display screen page 2000 shown in FIG. 15, the latest position of the article having the article name selected by the user from the article selection screen page 1000 shown in FIG. 14 is displayed as the position P on the map displayed based on the received map display data. Also, in the article position display screen page 2000, based on the received error information, the error range R that indicates the error in the article position is displayed. Thus, the user can see that the article of the article name selected from the article selection screen page 1000 is present near the position P with the error range R. Therefore, the user can find the desired article by searching near the position P with the error range R.

Note that in step S1105, the user terminal 50 can acquire, in addition to the latest position information, the position information within a past predetermined period of time. As a result, it is possible to display the movement trajectory of the article from the position at a past predetermined time to the latest position on the display part 53 of the user terminal 50. Therefore, the user can more easily estimate from the displayed movement trajectory whereabouts in the error range R the article is present.

In such a way, the position management system 1 of the first embodiment of the present invention manages the movement history information of the wireless tag 10 physically associated with the article. Therefore, even if the article is stored in a place where the radio waves do not reach (for example, deep in a metallic shelf), the position information near the stored place is managed by the position management system 1 as the latest position information.

Also, according to the position management system 1 of the first embodiment of the present invention, the user can cause the user terminal 50 to display the position of the desired article. At this time, the user terminal 50 can display a position near the place where the article is stored, by acquiring the latest position information of the article selected by the user, even if the article is stored at a place where the radio waves do not reach, or the like. Therefore, the user can find the desired article by searching near the displayed position.

Thus, according to the first embodiment of the present invention, it is possible to manage the current position of an apparatus even in an environment that includes many shields.

Process Detail of Second Embodiment

Next, processes in the position management system 1 according to the second embodiment of the present invention will be described in detail.

Technology is known with which in response to a reception of a signal that is transmitted based on a worker's operation, a state of a wireless tag is switched to a halt state where radio waves are not transmitted, whereby power consumption in the wireless tag can be reduced (for example, see Japanese Patent No. 5257662).

However, in this technology, power consumption in the wireless tag may not be sufficiently reduced. For example, if an article is used randomly for a period of time in a range from several hours through several tens of hours, the worker is to perform the operation to cause the wireless tag to enter the halt state each time when the use of the article is ended.

Therefore, if the worker does not perform the operation properly, power consumption cannot be sufficiently reduced.

The second embodiment of the present invention has been devised in consideration of such a situation, and an object is to reduce power consumption of an apparatus that manages the position of an article.

Figure 16:
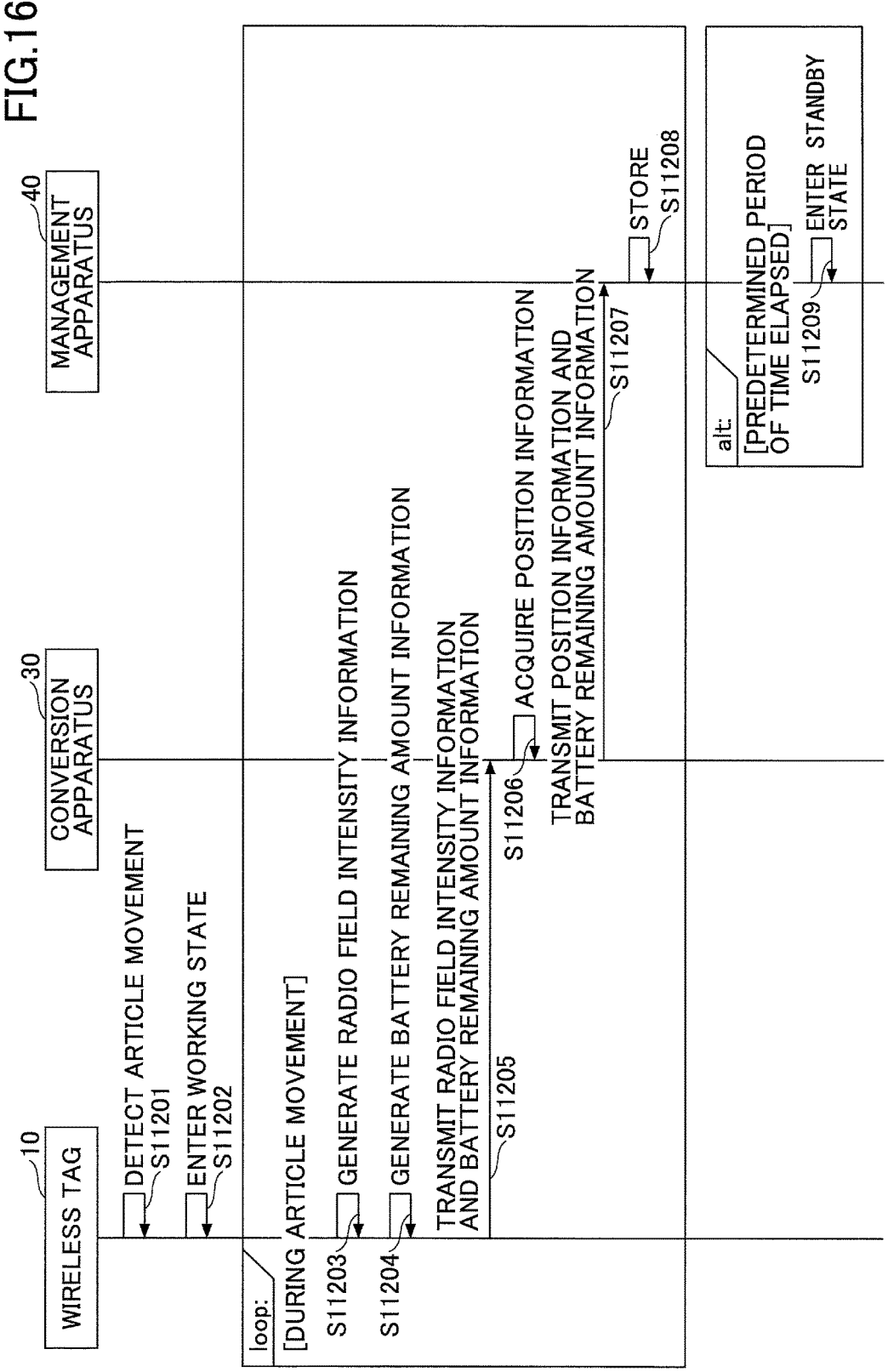
FIG. 16 is sequence diagram of one example of a movement history information and battery remaining amount information storage process according to the second embodiment of the present invention.

First, a process of storing the movement history information of the wireless tag 10 and the battery remaining amount information in the management apparatus 40 in a case where, for example, a worker in a factory, or the like, moves the article with which the wireless tag 10 is physically associated (for example, to which the wireless tag 10 is attached) will be described with reference to FIG. 16. FIG. 16 is sequence diagram of one example of the movement history information and battery remaining amount information storage process according to the second embodiment of the present invention. Note that in FIG. 16, it is assumed that the power state of the wireless tag 10 before the worker, or the like, moves the article is the standby state.

The worker, or the like, starts moving the article with which the wireless tag 10 is physically associated. As a result, the movement detection part 11 of the wireless tag 10 detects that the article starts moving (step S11201).

In the wireless tag 10, after the movement detection part 11 detects that the article starts moving, the power control part 12 supplies power from the battery 106 to the wireless module 105, and causes the wireless tag 10 to enter the working state (step S11202). As a result, the wireless communications part 14 of the wireless tag 10 receives the radio waves of wireless communications transmitted by the wireless communications apparatus 20. In such a way, the wireless tag 10 according to the second embodiment of the present invention starts receiving the radio waves of wireless communications by supplying power to the wireless module 105 in response to the start of movement of the article with which the wireless tag 10 is physically associated.

Next, the radio field intensity measurement part 15 of the wireless tag 10 measures the radio field intensity of the radio waves received by the wireless communications part 14, and generates the corresponding radio field intensity information (step S11203). At this time, the wireless communications part 14 of the radio field intensity measurement part 15 receives the plurality of sets of radio waves transmitted by the plurality of the wireless communications apparatuses 20, measures the radio field intensity of the respective sets of radio waves, and generates the corresponding radio field intensity information. In other words, the radio field intensity information generated by the radio field intensity measurement part 15 includes the plurality of sets each including the apparatus ID and the radio field intensity value. For example, the radio field intensity information includes the plurality of sets of apparatus IDs and the radio field intensity values such as (apparatus ID, radio field intensity value)= (AP1, 50), (AP2, 60), and so forth. Also, the radio field intensity information can include information concerning date and time at which the radio field intensity measurement part 15 generates the radio field intensity information.

Next, in the wireless tag 10, after the movement detection part 11 detects that the article starts moving, the remaining amount measurement part 13 measures the power remaining amount in the battery 106, and generates the battery remaining amount information (step S11204). For example, the remaining amount measurement part 13 acquires information that indicates the current voltage of the battery 106, and information that indicates the voltage in the fully charged state, measures the power remaining amount from the thus acquired information, and generates the battery remaining amount information. The battery remaining amount information includes the tag ID of the wireless tag 10 and the battery remaining amount of the battery 106.

Next, the wireless communications part 14 of the wireless tag 10 transmits the radio field intensity information generated by the radio field intensity measurement part 15 and the battery remaining amount information generated by the remaining amount measurement part 13 to the conversion apparatus 30 (step S11205). Note that the wireless communications part 14 can transmit the radio field intensity information and the battery remaining amount information directly to the conversion apparatus 30 or can transmit them to the conversion apparatus 30 via one or more of the wireless communications apparatuses 20.

If the wireless tag 10 and the conversion apparatus 30 are apart from one another by such a distance that they cannot directly carry out wireless communications with one another, the wireless communications part 14 of the wireless tag 10 transmits the radio field intensity information and the battery remaining amount information to a nearby wireless communications apparatus 20. Then, if the nearby wireless communications apparatus 20 can directly transmit the information to the conversion apparatus 30, it transmits the radio field intensity information and the battery remaining amount information to the conversion apparatus 30. If the nearby wireless communications apparatus 20 cannot directly transmit the information to the conversion apparatus 30, it transmits the radio field intensity information and the battery remaining amount information to another wireless communications apparatus 20. In such a way, the wireless communications part 14 of the wireless tag 10 can transmit the radio field intensity information and the battery remaining amount information to the conversion apparatus 30 through one or more wireless communications apparatuses 20 which relay the information.

In the conversion apparatus 30, after the wireless communications part 31 receives the radio field intensity information and the battery remaining amount information, the position information acquisition part 32 acquires the position information based on the radio field intensity information, the installation area information, and the estimation model (step S11206).

More specifically, the position information acquisition part 32 reads the installation area information, and converts the apparatus ID of the wireless communications apparatus 20 included in the radio field intensity information to the installation area ID. In other words, the position information acquisition part 32 converts the apparatus ID and the radio field intensity value included in each set of radio field intensity information into the installation area ID and the radio field intensity value, respectively. Then, the position information acquisition part 32 estimates the position information of the wireless tag 10 based on the respective sets each including the installation area ID and the radio field intensity value as well as the estimation model, and thus acquires the estimated position information. The thus acquired position information includes, as described above, the area ID and the coordinate (i.e., the relative coordinate) information with respect to the reference position in the area identified by the area ID. In such a way, the conversion apparatus 30 converts the radio field intensity information to the position information.

Note that, according to the second embodiment of the present invention, the apparatus ID of the wireless communications apparatus 20 is converted into the installation area ID in step S11206. However, this conversion process can be carried out in step S11208 that will be described later. In other words, in step S11206, the position information acquisition part 32 can estimate the position information of the wireless tag 10 based on the respective sets each including the apparatus ID and the radio field intensity value and the estimation model and acquire the estimated position information.

Then, the network communications part 33 of the conversion apparatus 30 transmits the position information acquired by the position information acquisition part 32 and the battery remaining amount information received by the wireless communications part 31 to the management apparatus 40 via the network N (step S11207).

In the management apparatus 40, after the network communications part 41 receives the position information and the battery remaining amount information, the information management part 42 associates the position information with the date and time (information concerning the date and time) and stores the position information as the movement history information stored in the movement history information database 44. Also, the information management part 42 stores the battery remaining amount information in the battery remaining amount information database 47 (step S11208).

At this time, the date and time with which the position information is associated can be the date and time at which the wireless tag 10 transmits the radio field intensity information. However, embodiments of the present invention are not limited thereto. For example, the date and time at which the management apparatus 40 receives the position information from the conversion apparatus 30 can be associated with the position information, and the position information can be stored as the movement history information.

Steps S11203 to S11208 described above are carried out at predetermined time intervals (for example, every several milliseconds, every several seconds, or so) while the article with which the wireless tag 10 is physically associated is being moved by the worker or the like. In other words, Steps S11203 to S11208 are carried out at predetermined time intervals while the movement detection part 11 of the wireless tag 10 physically associated with the article is detecting that the article is moving. However, the battery remaining amount information generating process in step S11204 can be carried out only once until step S11209 which will be described later is carried out.

Next, if the movement detection part 11 does not detect movement of the article for a predetermined period of time, the power control part 12 of the wireless tag 10 stops supplying power to the wireless module 105, and causes the wireless tag 10 to enter the standby state (step S11209). Thus, if the predetermined period of time elapses in a state where the article with which the wireless tag 10 is physically associated has been stopped, the wireless tag 10 according to the second embodiment stops supplying power to the wireless module 105, and stops receiving the radio waves of wireless communications. The predetermined period of time can be, for example, in a range from several seconds to several tens of seconds.

Thus, according to the position management system 1 of the second embodiment, even in a case where the article is moved to a place where the radio waves do no reach (for example, deep in a metallic shelf), the movement history information until immediately before the wireless tag 10 becomes not able to receive the radio waves is managed by the management apparatus 40.

Also, in the wireless tag 10 included in the position management system 1 according to the second embodiment, the power state is changed to the standby state if a predetermined period time elapses in a state where the article has been stopped, whereas the power state is changed to the working state if the article starts moving. In other words, according to the wireless tag 10 of the second embodiment, power is supplied to the wireless module 105 only when the article is moving. Thus, according to the wireless tag 10 of the second embodiment, it is possible to reduce power consumption in the wireless module 105, and prolong the life of the battery 106.

Figure 17:
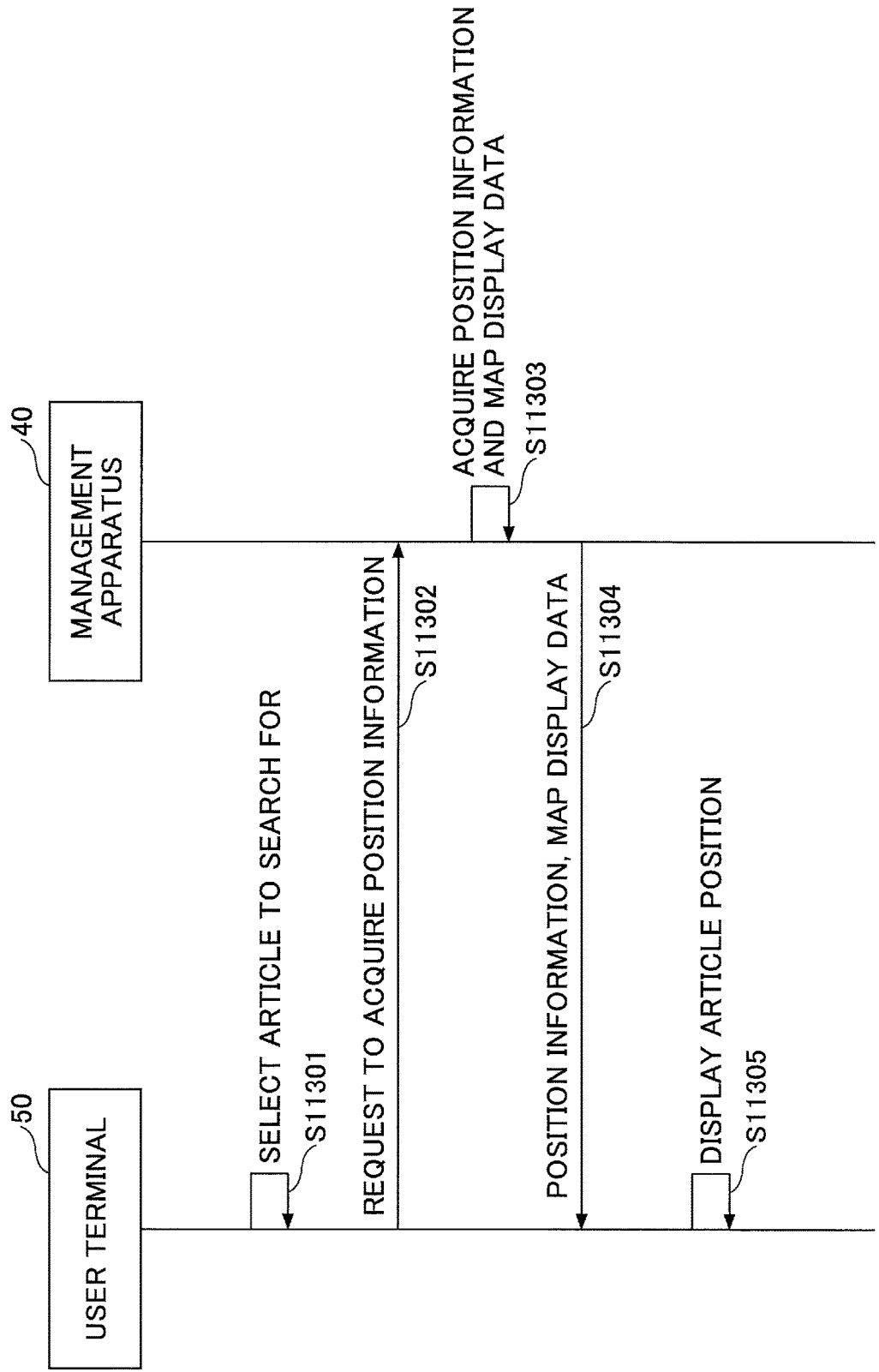
FIG. 17 is a sequence diagram of one example of a position information display process according to the second embodiment of the present invention.

Next, a process for the user to cause the user terminal 50 to display the position such as the place where the article is stored will be described with reference to FIG. 17. FIG. 17 is a sequence diagram illustrating the position information display process according to the second embodiment of the present invention.

First, the user operates the user terminal 50, and, for example, causes it to display the article selection screen page 1000 shown in FIG. 14 on the display device 202. Then, the user selects the article to search for (in other words, the article for which the current position is to be displayed) from the article selection screen page 1000 (step S11301). This process can be implemented as a result of, for example, the user selecting the desired article name from among the article name list 1100 displaced in the article selection screen page 1000.

Note that the user terminal 50 can acquire the battery remaining amount information for each wireless tag 10 from the management apparatus 40 before the selection screen page 1000 is displayed on the display device 202, associate the acquired battery remaining amount information with the article name, and display the battery remaining amount information together with the corresponding article name in the selection screen page 1000. As a result, the user of the user terminal 50 can know the battery remaining amount of the battery included in the wireless tag 10 that is physically associated with the article.

Next, in the user terminal 50, after the input part 52 receives the selection of the article name, the network communications part 51 transmits a position information acquisition request for the article having the selected article name to the management apparatus 40 (step S11302). The position information acquisition request includes the selected article name. Note that the position information acquisition request can include, instead of the article name, an article ID for uniquely identifying the article of the selected article name.

In the management apparatus 40, after the network communications part 41 receives the position information acquisition request, the information management part 42 acquires the corresponding position information and map display data (step S11303). In other words, first, the information management part 42 acquires the tag ID associated with the article name from the article information stored in the article information database 46. Next, the information management part 42 acquires the latest position information (i.e., the position information having the most recent date and time) associated with the acquired tag ID from the movement history information stored in the movement history information database 44. Finally, the information management part 42 acquires the map display data associated with the area ID included in the acquired position information from the map information stored in the map information database 45. Thus, the information management part 42 acquires the latest position information of the article having the article name selected by the user as well as the map display data for displaying the map of the area.

Then, the network communications part 41 of the management apparatus 40 transmits the position information and the map display data acquired by the information management part 42 to the user terminal (step S11304). Note that, at this time, the network communications part 41 of the management apparatus 40 transmits error information that indicates the error in the position information acquired by the information management part 42 to the user terminal 50. Such error information can be acquired as a value that is, for example, previously determined by the administrator of the position management system 1, or the like, based on the estimation accuracy of the estimation model stored in the estimation model database 35, the standards of wireless communications used by the wireless communications apparatus 20, and/or the like.

Finally, in the user terminal 50, after the network communications part 51 receives the position information and the map display data, the display part 53 causes, for example, the article position display screen page 2000 shown in FIG. 15 to be displayed on the display device 202 (step S11305). In the article position display screen page 2000 shown in FIG. 15, the latest position of the article having the article name selected by the user from the article selection screen page 1000 shown in FIG. 14 is displayed as the position P on the map displayed based on the received map display data. Also, in the article position display screen page 2000, based on the received error information, the error range R that indicates the error in the article position is displayed. Thus, the user can see that the article of the article name selected from the article selection screen page 1000 is present near the position P with the error range. Therefore, the user can find the desired article by searching near the position P with the error range R.

Also, according to the position management system 1 in the second embodiment, when the user terminal 50 is to acquire the article position information, it is not necessary to carry out communications with the wireless tag 10. Therefore, the user terminal 50 can acquire the article position information without consuming the power of the battery 106 included in the wireless tag 10.

Note that in step S11305, the user terminal 50 can acquire, in addition to the latest position information, the position information within a past predetermined period of time. As a result, it is possible to display the movement trajectory of the article from the position at a past predetermined time to the latest position on the display part 53 of the user terminal 50. Therefore, the user can more easily estimate from the displayed movement trajectory whereabouts in the error range R the article is present.

Figure 18:
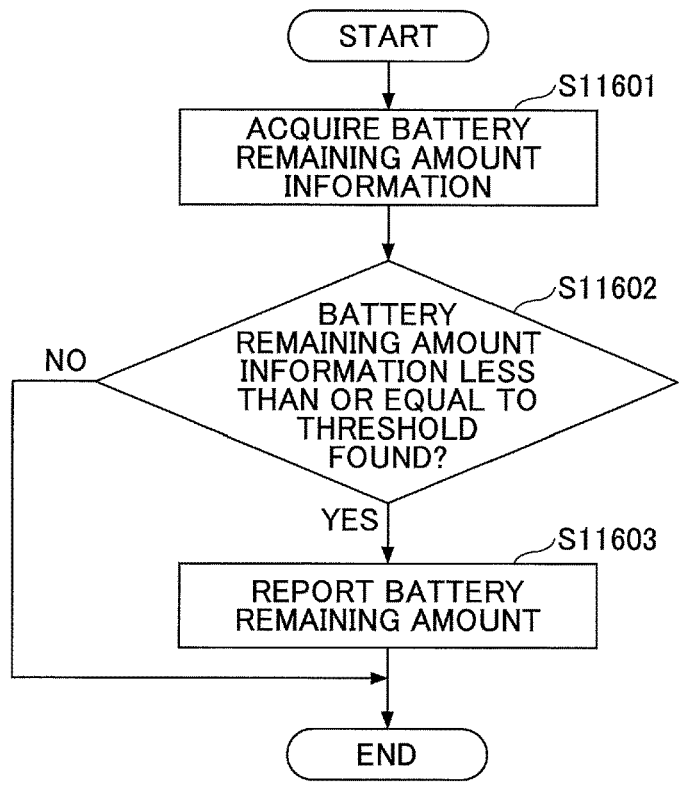
FIG. 18 is a flowchart of one example of a battery remaining amount reporting process according to the second embodiment of the present invention.

Next, a process of reporting the battery remaining amount to, for example, the user terminal 50 of the user such as the administrator if the remaining amount of the battery included in the wireless tag 10 becomes equal to or below a predetermined threshold will be described with reference to FIG. 18. FIG. 18 is a flowchart of one example of the battery remaining amount reporting process according to the second embodiment of the present invention. Note that the battery remaining amount reporting process that will now be described is carried out at predetermined time intervals for example, every day, every week, or so.

The remaining amount reporting part 43 of the management apparatus 40 acquires the battery remaining amount information from the battery remaining amount information database 47 (step S11601). Next, the remaining amount reporting part 43 determines whether the acquired battery remaining amount information includes an item of the battery remaining amount information that indicates the battery remaining amount equal to or below the threshold (step S11602).

If it is determined in step S11602 that there is no item of the battery remaining amount information that indicates the battery remaining amount equal to or below the threshold, the management apparatus 40 ends the process.

If it is determined in step S11602 that there is an item of the battery remaining amount information that indicates the battery remaining amount equal to or below the threshold, the remaining amount reporting part 43 transmits the item of the battery remaining amount information determined to indicate the battery remaining amount equal to or below the threshold to the predetermined user terminal 50 of the user such as the administrator (step S11603). Thus, as a result of the remaining amount reporting part 43 transmitting the item of the battery remaining amount information determined to indicate the battery remaining amount equal to or below the threshold to the user terminal 50, it reports that there is the wireless tag 10 for which the battery needs to be replaced.

Figure 19:
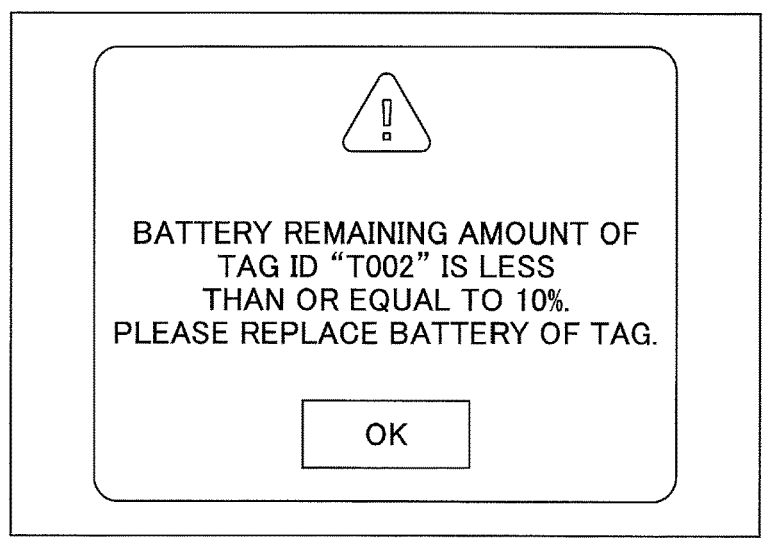
FIG. 19 illustrates a battery remaining amount reporting screen page.

As a result, on the display device 202 of the user terminal 50 of the user such as the administrator, the display part 53 displays a battery remaining amount reporting screen page 3000 such as that, for example, shown in FIG. 19. The user such as the administrator can know from the displayed battery remaining amount reporting screen page 3000 displayed on of the user terminal 50 the wireless tag 10 in which the battery remaining amount becomes equal to or below the threshold. Note that the battery remaining amount reporting screen page 3000 shown in FIG. 19 shows an example where, in a case where "10%" is set as the threshold, the item of the battery remaining amount information that includes the tag ID "T002" is transmitted by the management apparatus 40 to the user terminal 50.

Note that in step S11602, the remaining amount reporting part 43 can estimate the timing at which the battery remaining amount in the wireless tag 10 becomes equal to or below the threshold based on, for example, the communication frequency based on the movement history information stored in the movement history information database 44 and the acquired battery remaining amount information. Then, the remaining amount reporting part 43 can report the estimated timing to the predetermined user terminal 50.

Thus, the position management system 1 according to the second embodiment manages the movement history information of the wireless tag 10 that is physically associated with the article. Therefore, even if the article is stored at a place where the radio waves do no reach (for example, deep in a metallic shelf), the position information near the place where the article is stored is managed by the position management system 1 as the latest position information.

Also, the wireless tag 10 according to the second embodiment supplies power to the wireless module 105 in response to movement of the article, whereas, if a predetermined period time has elapsed in a state where the article has been stopped, the wireless tag 10 according to the second embodiment, stops supplying power to the wireless module 105 from the battery 106. As a result, according to the wireless tag 10 of the second embodiment, it is possible to reduce power consumption and it is possible to prolong the life of the battery 106.

Also, in the position management system 1 according to the second embodiment, the user can cause the user terminal 50 to display the position of the desired article. At this time, the user terminal 50 can display a position near the place where the article is stored by acquiring the latest position information of the article selected by the user, even if the article is stored at a place where the radio waves do no reach, or the like. Therefore, the user can find the desired article by searching near the displayed position.

Further, in the position management system 1 according to the second embodiment, if the battery remaining amount in the wireless tag 10 becomes equal to or below the threshold, information prompting replacement of the battery is transmitted to the user terminal 50 of the user such as the administrator. Therefore, the user of the position management system 1 according to the second embodiment can be informed there is the wireless tag 10 for which the battery needs to be replaced.

According to the second embodiment, it is possible to reduce power consumption of an apparatus that manages the position of an article.

Process Detail of Third Embodiment

Next, processes in the position management system 1 according to the third embodiment will be described in detail.

Technology is known with which the intensity of radio waves received by a communication apparatus such as wireless tag physically associated with an article is used and the position of the article indoors is estimated. Using such technology, for example, a user of the article such as an administrator acquires the position of the article such as an installation place, a storage place, or the like.

Also, technology is known with which time intervals are adjusted at which communications are carried out between an apparatus that determines the positions of wireless tags and the wireless tags, depending on the number of the wireless tags within an area, the distances between the apparatus and the wireless tags, or the like (for example, see Japanese Laid-Open Patent Application No. 2014-217049).

In the above-mentioned technology, the radio field intensity received by the wireless tag may fluctuate, and an error may occur in position information acquired based on the fluctuation. In particular, depending on the standard of wireless communications to which the wireless tag is in conformity, interference with other radio waves of wireless communications may occur and the radio field intensity may fluctuate. Also, if the wireless tag is physically associated with an article that is installed indoors, radio waves may be reflected, absorbed, diffracted by walls, humans, things, or the like indoors, and thus, the radio field intensity may fluctuate.

If the position is estimated based on the radio field intensity that includes such a fluctuation, an erroneous position may be reported to the user.

In consideration of such circumstances, an object of the third embodiment is to improve the accuracy in determining the current position of an article.

Figure 20:
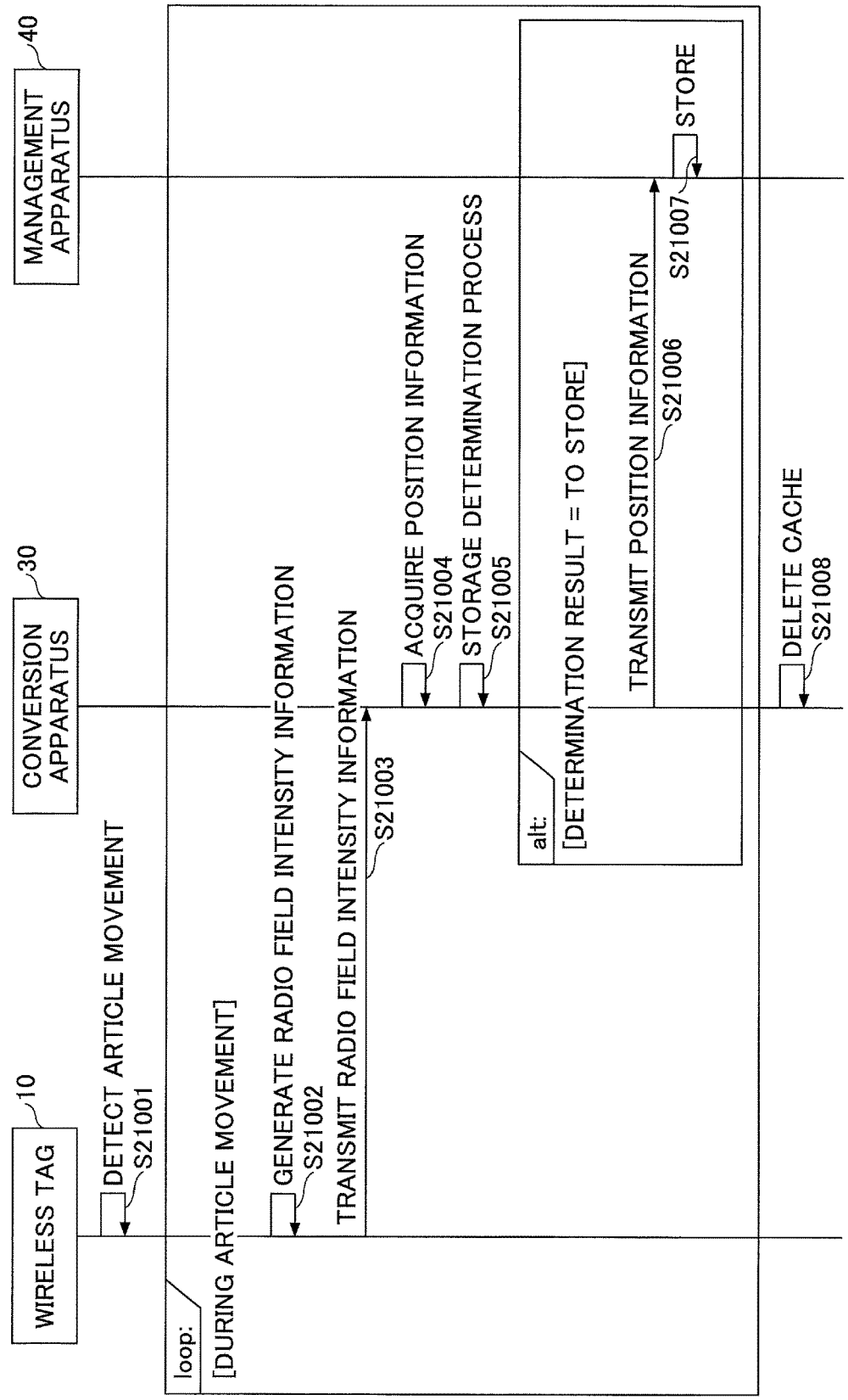
FIG. 20 is a sequence diagram of one example of a movement history information storage process according to the third embodiment of the present invention.

First, a process of storing the movement history information of the wireless tag 10 in the management apparatus 40 in a case where, for example, a worker in a factory, or the like, moves the article with which the wireless tag 10 is physically associated (for example, to which the wireless tag 10 is attached) will be described with reference to FIG. 20. FIG. 20 is sequence diagram of one example of the movement history information storage process according to the third embodiment of the present invention.

The worker, or the like, starts moving the article with which the wireless tag 10 is physically associated (for example, to which the wireless tag 10 is attached). As a result, the movement detection part 11 of the wireless tag 10 detects that the article starts moving (step S21001). At this time, the wireless tag 10 starts supplying power to the wireless module 105 from the battery 106 in response to the detection by the movement detection part 11. The wireless communications part 14 then receives the radio waves of wireless communications transmitted from the wireless communications apparatus 20. Thus, power is supplied to the wireless module 105 of the wireless tag 10 in response to the detection by the movement detection part 11. As a result, it is possible to reduce power consumption in the wireless module 105.

Next, the radio field intensity measurement part 15 of the wireless tag 10 measures the radio field intensity of radio waves received by the wireless communications part 14, and generates the radio field intensity information (step S21002). At this time, the radio field intensity measurement part 15 receives a plurality of sets of the radio waves transmitted from a plurality of the wireless communications apparatuses 20 through the wireless communications part 14, and measures the radio field intensity of the respective sets of radio waves, and generates the corresponding sets of radio field intensity information. In other words, the radio field intensity information generated by the radio field intensity measurement part 15 includes a plurality of sets each of which includes the apparatus ID and the radio field intensity value. For example, the radio field intensity information includes the plurality of sets of the apparatus ID and the radio field intensity value such as (apparatus ID, radio field intensity value)=(AP1, 50), (AP2, 60), and so forth. Also, the radio field intensity information includes the tag ID of the wireless tag 10 that transmits the radio field intensity information. Also, the radio field intensity information can include the date and time information (i.e., information concerning the date and the time) at which the radio field intensity measurement part 15 generates the corresponding set of radio field intensity information.

Next, the wireless communications part 14 of the wireless tag 10 transmits the radio field intensity information generated by the radio field intensity measurement part 15 to the conversion apparatus 30 (step S21003). Note that the wireless communications part 14 can transmit the radio field intensity information directly to the conversion apparatus 30 or can transmit the radio field intensity information to the conversion apparatus 30 through one or more of the wireless communications apparatuses 20.

For example, if the wireless tag 10 and the conversion apparatus 30 are apart from one another by such a distance that they cannot directly carry out wireless communications with one another, the wireless communications part 14 of the wireless tag 10 transmits the radio field intensity information to a nearby wireless communications apparatus 20. Then, if the nearby wireless communications apparatus 20 can directly transmit the information to the conversion apparatus 30, it transmits the radio field intensity information to the conversion apparatus 30. If the nearby wireless communications apparatus 20 cannot directly transmit the information to the conversion apparatus 30, it transmits the radio field intensity information to yet another wireless communications apparatus 20. Thus, the wireless communications part 14 of the wireless tag 10 can transmit the radio field intensity information to the conversion apparatus 30 through one or more wireless communications apparatuses 20 which relay the information.

In the conversion apparatus 30, after the wireless communications part 31 receives the radio field intensity information, the position information acquisition part 32 acquires the position information based on the radio field intensity information, the installation area information, and the estimation model (step S21004).

More specifically, the position information acquisition part 32 reads the installation area information, and converts the apparatus ID of the wireless communications apparatus 20 included in the radio field intensity information to the installation area ID. In other words, the position information acquisition part 32 converts the apparatus ID and the radio field intensity value included in each set of radio field intensity information into the installation area ID and the radio field intensity value, respectively. Then, the position information acquisition part 32 estimates the position information of the wireless tag 10 based on the respective sets each including the installation area ID and the radio field intensity value as well as the estimation model, and thus acquires the estimated position information. The thus acquired position information includes, as described above, the area ID and the coordinate (i.e., the relative coordinate) information with respect to the reference position in the area identified by the area ID. In such a way, the conversion apparatus 30 converts the radio field intensity information to the position information.

Note that, according to the third embodiment, the apparatus ID of the wireless communications apparatus 20 is converted into the installation area ID in step S21004. However, this conversion process can be carried out in step S21007 that will be described later. In other words, in step S21004, the position information acquisition part 32 can estimate the position information of the wireless tag 10 based on the respective sets each including the apparatus ID and the radio field intensity value and the estimation model and acquire the estimated position information.

Next, the storage determination part 36 of the conversion apparatus 30 determines whether to store the position information acquired by the position information acquisition part 32 in step S21004 in the management apparatus 40 (step S21005). More specifically, if the cached position information stored in the cache storage part 37 and the position information acquired by the position information acquisition part 32 satisfy a predetermined relationship, the storage determination part 36 determines to store the position information in the management apparatus 40. On the other hand, if the cached position information stored in the cache storage part 37 and the position information acquired by the position information acquisition part 32 do not satisfy the predetermined relationship, the storage determination part 36 determines that the position information is not to be stored in the management apparatus 40. Details of the storage determination process in step S21005 by the storage determination part 36 will be described later.

If it is determined in step S21005 that the position information is to be stored in the management apparatus 40, the network communications part 33 of the conversion apparatus 30 transmits the position information acquired by the position information acquisition part 32 to the management apparatus 40 via the network N (step S21006).

In the management apparatus 40, after the network communications part 41 receives the position information from the conversion apparatus 30, the information management part 42 associates the position information with the corresponding date and time information, and stores the position information in the movement history information database 44 as the movement history information (step S21007). At this time, the date and time with which the position information is associated can be the date and time at which the wireless tag 10 transmits the radio field intensity information. However, embodiments of the present invention are not limited thereto. For example, the date and time at which the management apparatus 40 receives the position information from the conversion apparatus 30 can be associated with the position information and the position information can be stored as the movement history information.

If it is determined in step S21005 that the position information is not to be stored in the management apparatus 40, the conversion apparatus 30 does not carry out step S21006. In other words, the position information acquired by the position information acquisition part 32 in step S21004 is not transmitted to the management apparatus 40. In this case, the conversion apparatus 30 can discard the position information acquired by the position information acquisition part 32.

Finally, the storage determination part 36 of the conversion apparatus 30 deletes the cached position information stored in the cache storage part 37 (step S21008). More specifically, the conversion apparatus 30 deletes the cached position information of the corresponding wireless tag 10 from the cache storage part 37 if the wireless tag 10 that is physically associated with the article is stopped (in other words, if the movement of the article ends). Note that the conversion apparatus 30 can determine that the movement of the article with which the wireless tag 10 is physically associated ends if, for example, a predetermined period of time elapses in a state where no radio field intensity information can be received from the corresponding wireless tag 10.

Steps S21002 to S21007 described above are carried out at predetermined time intervals (for example, every several milliseconds, every several seconds, or so) while the article with which the wireless tag 10 is physically associated is being moved by the worker or the like. In other words, Steps S21002 to S21006 are carried out at predetermined time intervals while the movement detection part 11 of the wireless tag 10 physically associated with the article is detecting that the article is moving.

Thus, even if the article is moved to such a place where the radio waves do not reach (for example, deep in a metallic shelf), the management apparatus 40 manages the movement history information until the time immediately before the wireless tag 10 becomes not able to receive the radio waves. Note that the wireless tag 10 stops supplying power to the wireless module 105 from the battery 106 after a predetermined period of time (for example, 60 seconds) elapses in a state where the movement detection part 11 cannot detect movement of the article (i.e., cannot detect that the article starts moving, is moving, or the like). As a result, for example, after the predetermined period of time elapses from when the article is stopped, the wireless communications part 14 stops receiving the radio waves of wireless communications transmitted from the wireless communications apparatus 20.

Also, in the conversion apparatus 30 according to the third embodiment, the position information determined by the storage determination part 36 not to be stored in the management apparatus 40 is not transmitted to the management apparatus 40. Therefore, this position information is not stored in the movement history information database 44 of the management apparatus 40. Thus, in the conversion apparatus 30 according to the third embodiment, the position information to be stored in the management apparatus 40 is determined by the conversion apparatus 30.

Next, details of the storage determination process in step S21005 of FIG. 20 will be described with reference to FIG.

Figure 21:
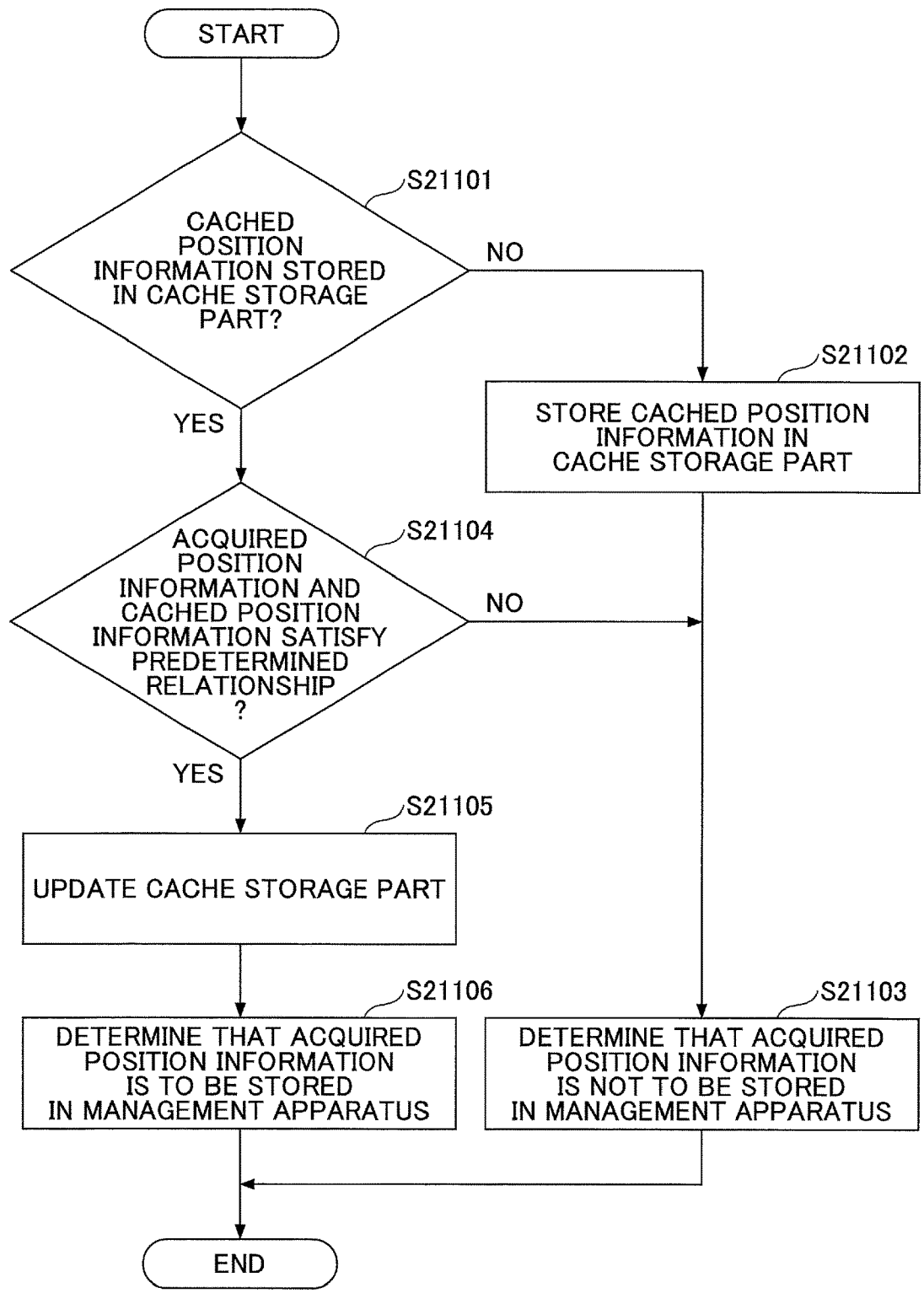
FIG. 21 is a flowchart of one example of a storage determination process according to the third embodiment of the present invention.

21. FIG. 21 is a flowchart of one example of the storage determination process according to the third embodiment of the present invention.

First, the storage determination part 36 of the conversion apparatus 30 determines whether the cached position information is stored in the cache storage part 37 (step S21101).

If the storage determination part 36 of the conversion apparatus 30 determines in step S21101 that the cached position information is not stored in the cache storage part 37, the storage determination part 36 stores the position information acquired by the position information acquisition part 32 in the cache storage part 37 (step S21102). Then, the storage determination part 36 determines that the position information acquired by the position information acquisition part 32 is not to be stored in the management apparatus 40 (step S21103), and ends the process. Note that, in FIG. 21, the position information acquired by the position information acquisition part 32 is referred to as "acquired position information".

Thus, the storage determination part 36 according to the third embodiment stores the acquired position information that is acquired by the position information acquisition part 32 first after the article starts moving, in the cache storage part 37 as the cached position information. However, embodiments of the present invention are not limited thereto. For example, before step S21101, the storage determination part 36 can acquire the latest position information of the corresponding tag ID from the movement history information database 44, and store the position information in the cache storage part 37 as the cached position information. Note that, in the cache storage part 37, the cached position information is associated with the tag ID of the wireless tag 10 that transmits the radio field intensity information that is used to generate the same cached position information.

If it is determined in step S21101 that the cached position information is stored, the storage determination part 36 determines whether the acquired position information and the cached position information satisfy the predetermined relationship (step S21104).

If it is determined in step S21104 that the predetermined relationship is satisfied, the storage determination part 36 stores the acquired position information in the cache storage part 37 as the cached position information and updates the cached position information (step S21105). Then, the storage determination part 36 determines to store the acquired position information in the management apparatus 40 (step S21106), and ends the process.

If it is determined in step S21104 that the predetermined relationship is not satisfied, the storage determination part 36 determines that the acquired position information is not to be stored in the management apparatus 40 (step S21103), and ends the process.

The predetermined relationship used in step S21104 can be the following relationship (1), (2), or the like.

(1) The distance between the cached position information and the acquired position information falls within a predetermined range.

At this time, in a case where, for example, a range of "greater than or equal to 4 m, and equal to or below 20 m" is set as the predetermined range, the storage determination part 36 determines to store the acquired position information in the management apparatus 40 if the distance between the cached position information and the acquired position information falls within the range. In other words, for example, assuming the time relationship t1<t2 holds, if the cached position information denotes the position information of the article at the time t1, the acquired position information denotes the position information of the article at the time t2, and the article moves a distance within the range during the period of time between t1 and t2, the acquired position information is stored in the management apparatus 40.

That is, for example, if a fluctuation occurs in the radio field intensity of the radio waves received by the wireless tag 10 from the wireless communications apparatus 20, the acquired position information based on the radio field intensity information having the fluctuation is not transmitted to the management apparatus 40. In other words, if the coordinate information included in the acquired position information suddenly decreases or suddenly increases due to the fluctuation in the radio field intensity, the acquired position information is not transmitted to the management apparatus 40. Therefore, according to the position management system 1 of the third embodiment, it is possible to prevent the position information that is estimated based on the radio field intensity information having a fluctuation from being stored in the management apparatus 40.

(2) The distance between the cached position information and the acquired position information is greater than or equal to a predetermined distance.

For example, in a case where "4 m" is set as the predetermined distance, the storage determination part 36 determines to store the acquired position information in the management apparatus 40 if the distance between the cached position information and the acquired position information is greater than or equal to "4 m". In other words, for example, assuming the time relationship t1<t2 holds, if the cached position information denotes the position information of the article at the time t1, the acquired position information denotes the position information of the article at the time t2, and the article moves greater than or equal to the predetermined distance during the period of time between t1 and t2, the acquired position information is stored in the management apparatus 40.

For example, if the article with which the wireless tag 10 is physically associated vibrates due to a vibration of the building, for example, the acquired position information is not transmitted to the management apparatus 40. Therefore, according to the position management system 1 in the third embodiment, it is possible to prevent the position information that is estimated based on the radio field intensity information having an influence of a vibration of the building, for example, from being stored in the management apparatus 40.

Note that the above-mentioned predetermined range and predetermined distance in the relationships (1) and (2) are determined by the user such as the administrator depending on the search accuracy required for the article to be managed by the position management system 1. By suitably determining the above-mentioned predetermined range and predetermined distance in the relationships (1) and (2) depending on the search accuracy required for the article to be managed by the position management system 1, it is possible to reduce the communications amount between the conversion apparatus 30 and the management apparatus 40.

Figure 22:
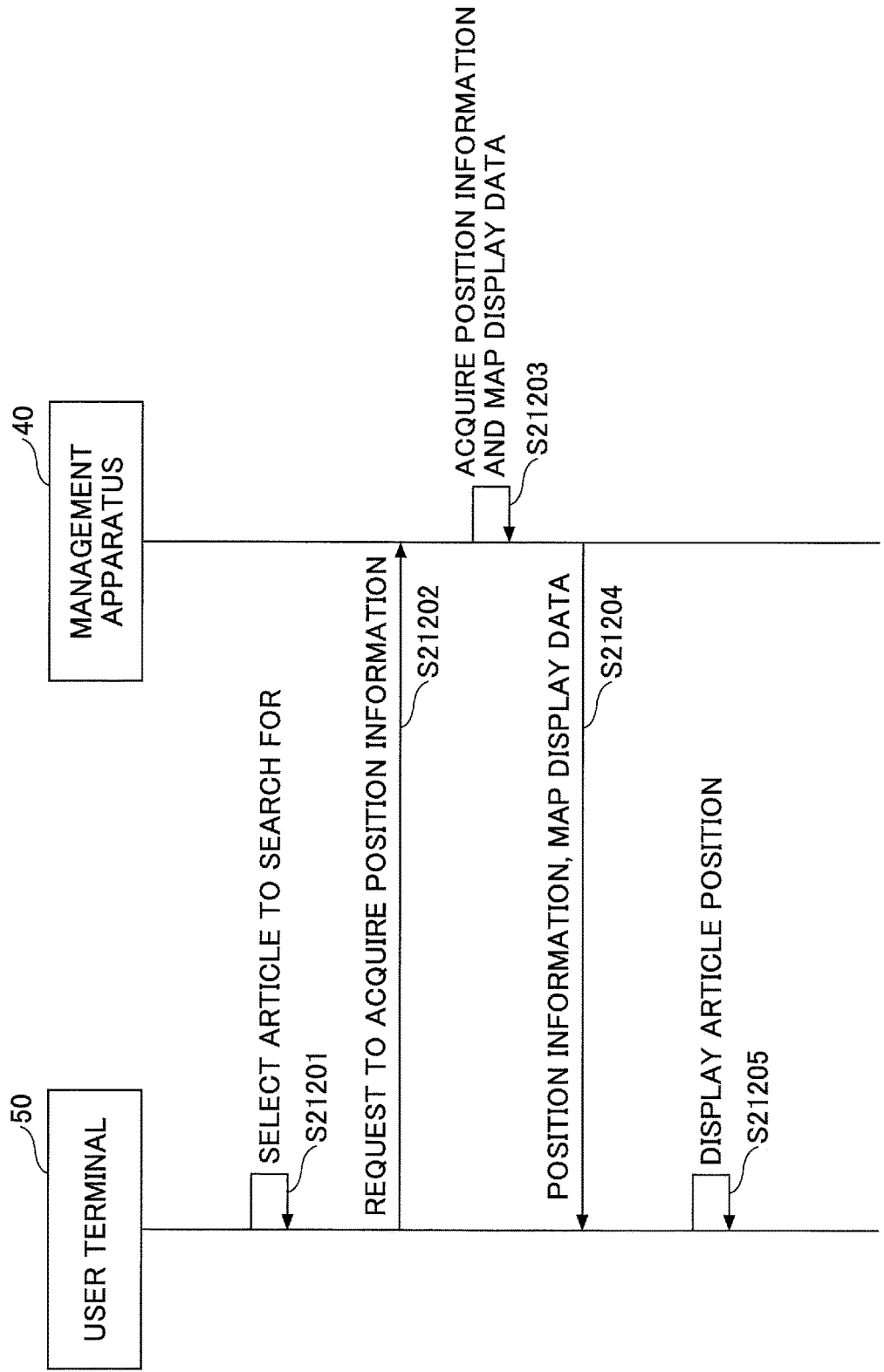
FIG. 22 is a sequence diagram of one example of a position information display process according to the third embodiment of the present invention.

Next, a process for the user to cause the user terminal 50 to display the position such as the place where the article is stored will be described with reference to FIG. 22. FIG. 22 is a sequence diagram illustrating the position information display process according to the third embodiment of the present invention.

First, the user operates the user terminal 50, and, for example, causes it to display the article selection screen page 1000 shown in FIG. 14 on the display device 202. Then, the user selects the article to search for (in other words, the article for which the current position is to be displayed) from the article selection screen page 1000 (step S21201). This process can be implemented as a result of, for example, the user selecting the desired article name from among the article name list 1100 displayed in the article selection screen page 1000.

Next, in the user terminal 50, after the input part 52 receives the selection of the article name, the network communications part 51 transmits a position information acquisition request for the article having the selected article name to the management apparatus 40 (step S21202). The position information acquisition request includes the selected article name. Note that the position information acquisition request can include, instead of the article name, the article ID for uniquely identifying the article of the selected article name.

In the management apparatus 40, after the network communications part 41 receives the position information acquisition request, the information management part 42 acquires the corresponding position information and map display data (step S21203). In other words, first, the information management part 42 acquires the tag ID associated with the article name from the article information stored in the article information database 46. Next, the information management part 42 acquires the latest position information (i.e., the position information having the most recent date and time) associated with the acquired tag ID from the movement history information stored in the movement history information database 44. Finally, the information management part 42 acquires the map display data associated with the area ID included in the acquired position information from the map information stored in the map information database 45. Thus, the information management part 42 acquires the latest position information of the article having the article name selected by the user as well as the map display data for displaying the map of the area.

Then, the network communications part 41 of the management apparatus 40 transmits the position information and the map display data acquired by the information management part 42 to the user terminal 50 (step S21204). Note that, at this time, the network communications part 41 of the management apparatus 40 transmits error information that indicates the error in the position information acquired by the information management part 42 to the user terminal 50. Such error information can be acquired as a value that is, for example, previously determined by the administrator of the position management system 1, or the like, based on the estimation accuracy of the estimation model stored in the estimation model database 35, the standards of wireless communications used by the wireless communications apparatus 20, and/or the like.

Finally, in the user terminal 50, after the network communications part 51 receives the position information and the map display data, the display part 53 causes, for example, the article position display screen page 2000 shown in FIG. 15 to be displayed on the display device 202 (step S21205). In the article position display screen page 2000 shown in FIG. 15, the latest position of the article having the article name selected by the user from the article selection screen page 1000 shown in FIG. 14 is displayed as the position P on the map displayed based on the received map display data. Also, in the article position display screen page 2000, based on the received error information, the error range R that indicates the error in the article position is displayed. Thus, the user can see that the article of the article name selected from the article selection screen page 1000 is present near the position P with the error range. Therefore, the user can find the desired article by searching near the position P with the error range R.

Note that in step S21205, the user terminal 50 can acquire, in addition to the latest position information, the position information within a predetermined preceding period of time. As a result, it is possible to display the movement trajectory of the article from the position at a past predetermined time to the latest position on the display part 53 of the user terminal 50. Therefore, the user can more easily estimate from the displayed movement trajectory whereabouts in the error range R the article is present.

Thus, the position management system 1 according to the third embodiment manages the movement history information of the wireless tag 10 physically associated with the article. Therefore, even if the article is stored in a place where the radio waves do not reach (for example, deep in a metallic shelf), the position information near the stored place is managed by the position management system 1 as the latest position information.

Also, in the position management system 1 according to the third embodiment, it is determined, based on the cached position information, whether to store the position information estimated from the radio field intensity information in the management apparatus 40. Therefore, it is possible to prevent the position information estimated from the radio field intensity information that includes a fluctuation from being stored in the management apparatus 40. Therefore, according to the position management system 1 of the third embodiment, it is possible to improve the accuracy in determining the article position.

Also, according to the position management system 1 of the third embodiment, the user can cause the user terminal 50 to display the position of the desired article. At this time, the user terminal 50 can display a position near the place where the article is stored by acquiring the latest position information of the article selected by the user even if the article is stored at a place where the radio waves do not reach, or the like. Therefore, the user can find the desired article by searching near the displayed position.

According to the third embodiment, it is possible to improve the accuracy in determining the current position of an article.

Fourth Through Sixth Embodiments

Next, the position management system 1 that can be used in any one of fourth through sixth embodiments of the present invention will be described. The position management systems 1 that can be used in any one of the fourth through sixth embodiments of the present invention differs from the position management systems 1 of the first through third embodiments of the present invention, described above, by having an IMES transmitter that transmits position information in conformity to the Indoor Messaging System (IMES) standard. Thus, the position management systems 1 that can be used in any one of the fourth through sixth embodiments of the present invention can manage indoor position information and outdoor position information. Concerning the fourth through sixth embodiments of the present invention, only differences from the first through third embodiments of the present invention will be described, and duplicate description will be omitted by giving the same reference numerals to the parts/devices/apparatuses having substantially the same functions as those of the first through embodiments of the present invention.

<System Configuration>

Figure 23:
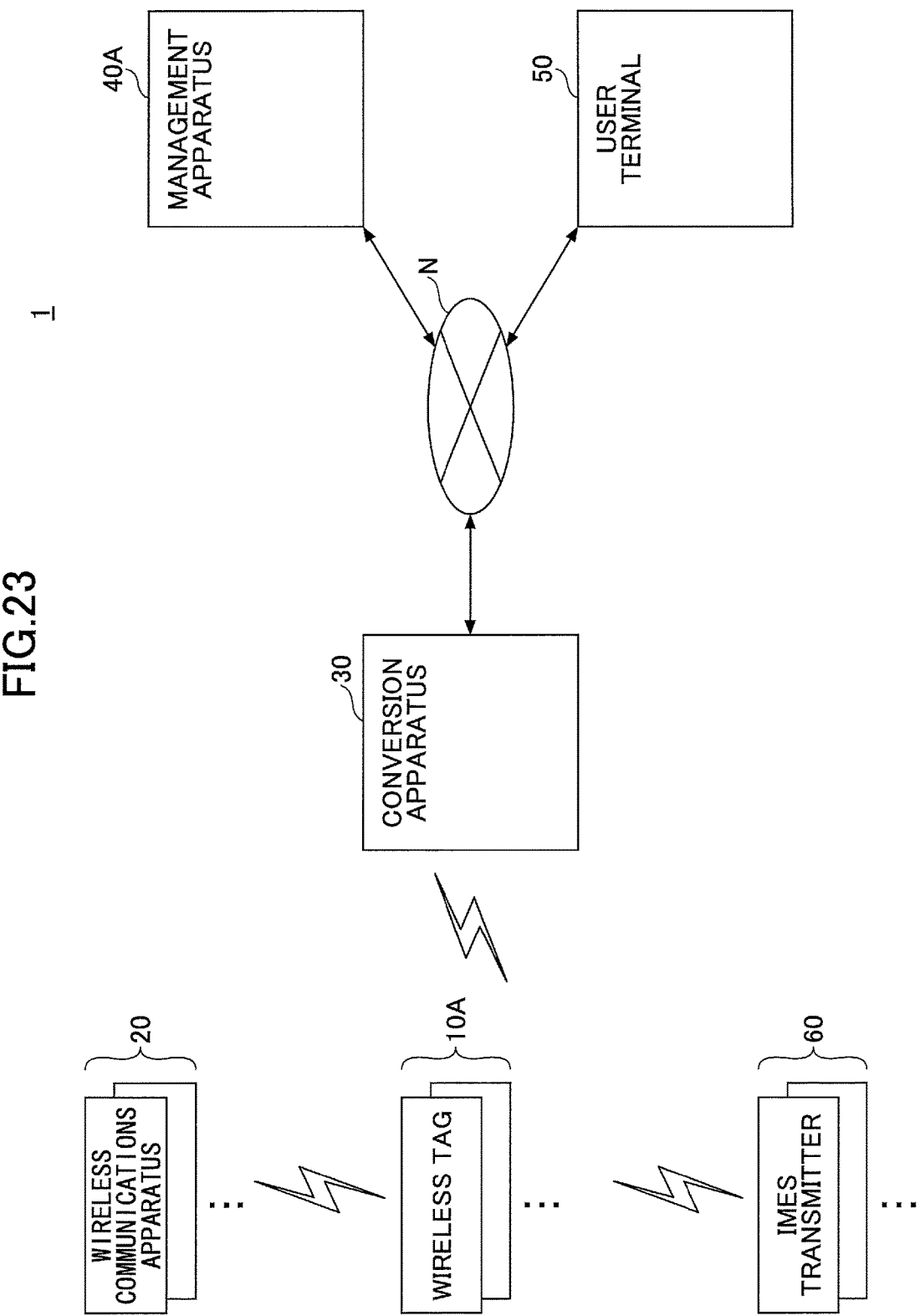
FIG. 23 is a system configuration diagram of one example of position management systems that can be used in any one of fourth through sixth embodiments of the present invention.

First, the position management system 1 that can be used in any one of the fourth through sixth embodiments of the present invention will be described with reference to FIG. 23. FIG. 23 is a system configuration diagram of one example of the position management system that can be used in any one of the fourth through sixth embodiments of the present invention. The position management system 1 that can be used in any one of the fourth through sixth embodiments of the present invention has the IMES transmitter 60.

The IMES transmitter 60 is a device that transmits position information in conformity to the IMES standard. One or more of the IMES transmitters 60 are installed at an area, and transmit position information to a predetermined surrounding range at predetermined time intervals. The position information in conformity to the IMES standard includes predetermined latitude and longitude information, floor information, and so forth, of the IMES transmitter 60. The floor information is information concerning a floor of a building, and is set, for example, in 0.5 floor units. Therefore, it is possible to determine on which floor the article with which a wireless tag 10A is physically associated (for example, to which a wireless tag 10A is attached) is present, at the longitude and the latitude that are indicated by the latitude and longitude information included in the position information.

The wireless tag 10A included in the position management system 1 that can be used in any one of the fourth through sixth embodiments of the present invention receives the position information transmitted by the IMES transmitter 60.

Hereinafter, for convenience, the position information described above concerning the first through third embodiments of the present invention (i.e., the position information estimated based on the radio field intensity information) will be referred to as "first position information", while the position information transmitted by the IMES transmitter 60 will be referred to as "second position information".

<Hardware Configuration>

Figure 24:
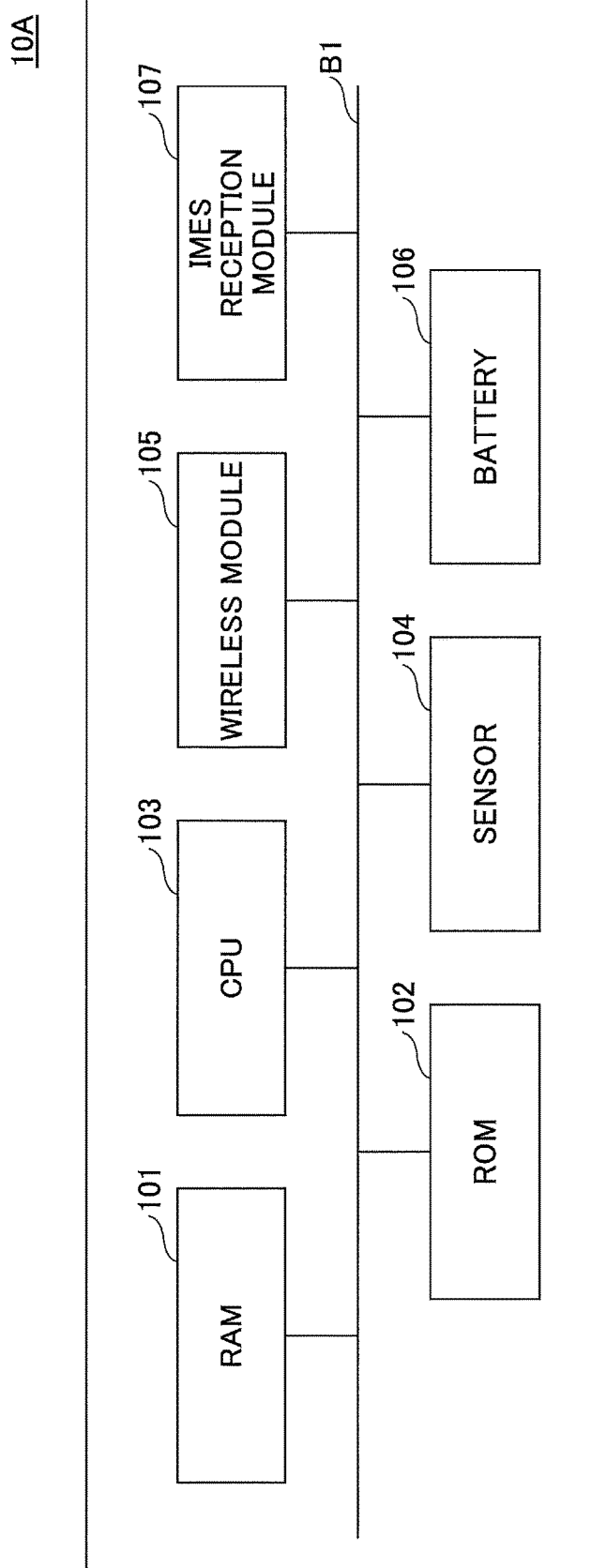
FIG. 24 is a hardware configuration diagram of one example of a wireless tag that can be used in any one of the fourth through sixth embodiments of the present invention.

Next, the hardware configuration of the wireless tag 10A included in the position management system 1 that can be used in any one of the fourth through sixth embodiments of the present invention will be described with reference to FIG. 24. FIG. 24 is a hardware configuration diagram of one example of the wireless tag that can be used in any one of the fourth through sixth embodiments of the present invention. The wireless tag 10A has a IMES reception module 107.

The IMES reception module 107 receives frames including the second position information in conformity to the IMES standard from the IMES transmitter 60.

The wireless tag 10A that can be used in any one of the fourth through sixth embodiments of the present invention implements various processes that will be described later in the hardware configuration shown in FIG. 24. Note that the wireless tag 10A that can be used in any one of the fourth through sixth embodiments of the present invention does not include an IMES transmission module. As a result, the wireless tag 10A that can be used in any one of the fourth through sixth embodiments of the present invention can be implemented at low cost in comparison to a case where a wireless tag includes an IMES transmission module.

<Functional Configuration>

Figure 25:
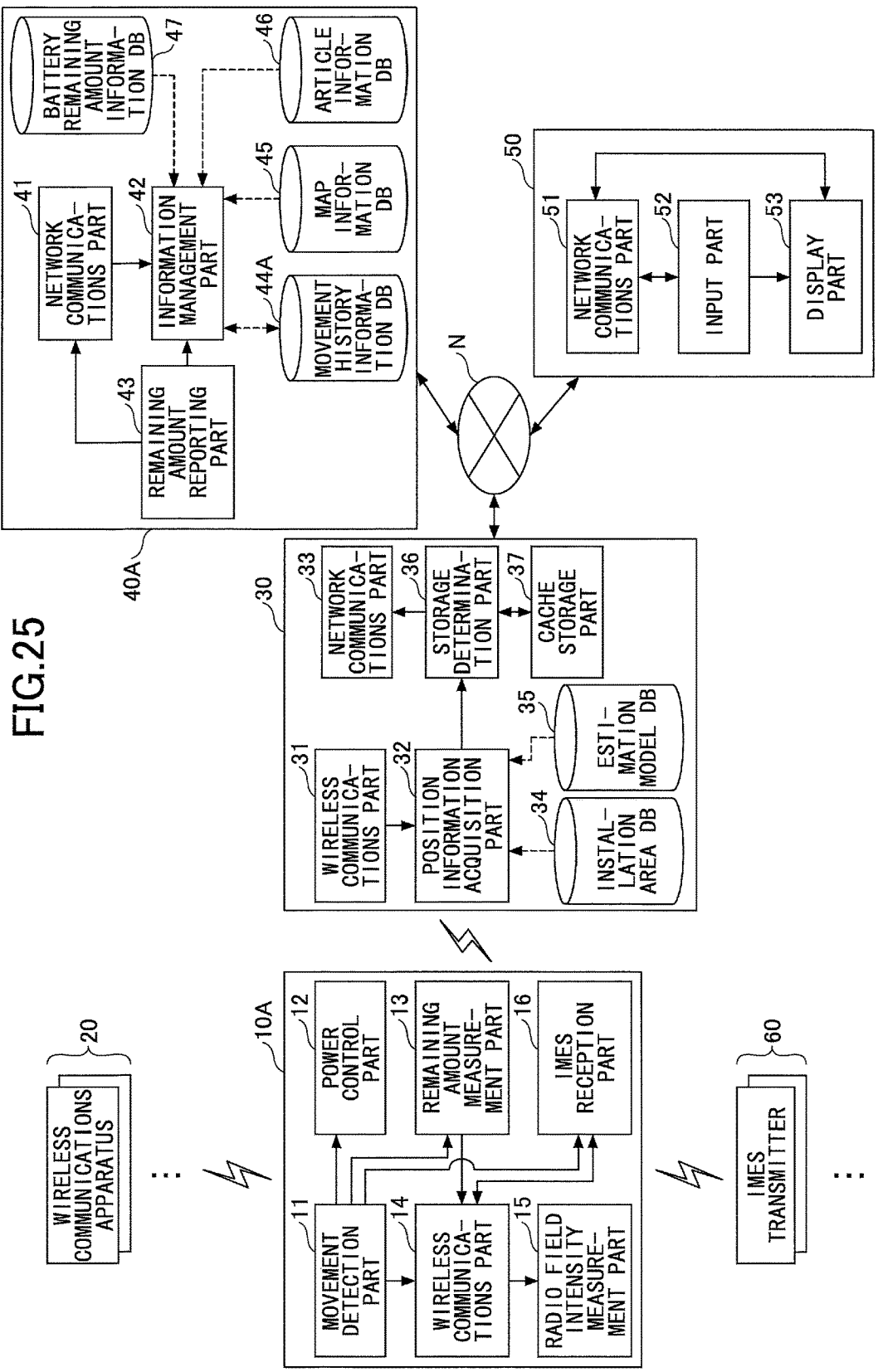
FIG. 25 is a functional configuration diagram of one example of the position management system that can be used in any one of fourth through sixth embodiments of the present invention.

Next, the functional configuration of the position management system 1 that can be used in any one of the fourth through sixth embodiments of the present invention will be described with reference to, FIG. 25. FIG. 25 is a functional configuration diagram of one example of the position management system that can be used in any one of fourth through sixth embodiments of the present invention. The wireless tag 10A shown in FIG. 25 differs from the wireless tag 10A shown in FIG. 5 in that it has an IMES reception part 16.

The IMES reception part 16 is implemented by, for example, the CPU 103, the IMES reception module 107, and so forth, receives radio waves in conformity to the IMES standard from the IMES transmitter 60, and acquires the second position information included in the radio waves.

In a management apparatus 40A that can be used in any one of the fourth through sixth embodiments, a movement history information database 44A is different from the movement history information database 44 in the management apparatus 40. Movement history information stored in the movement history information database 44A will now be described with reference to, FIG. 26. FIG. 26 illustrates one example of the movement history information database that can be used in any one of the fourth through sixth embodiments of the present invention. The movement history information shown in FIG. 26 is information for managing a history of the first position information and the second position information of the wireless tag 10A at predetermined time intervals, and includes data items, for each tag ID, date and time, first position information, and second position information. The tag ID, the date and time, and the first position information are the same as those described above concerning the first through third embodiments of the present invention. The second position information includes latitude and longitude information and floor information, and so forth, transmitted from the IMES transmitter 60 and received by the wireless tag 10A. Thus, the movement history information of FIG. 26 manages the history of the first position information and the second position information. Therefore, for example, it is possible to display the position of the article using the first position information on a map that indicates indoors such as the inside a factory, or the like, while it is further possible to display the position of the same article using the second position information on a map that also includes outdoors such as the outside of the factory, or the like. Further, in the second position information, in addition to the latitude and longitude information, floor information can be included. Thereby, it is possible to display on which floor in the factory the article is.

The functional configuration of the position management system 1 that can be used in any one of the fourth through sixth embodiments of the present invention has been described with reference to FIG. 25 and so forth. However, embodiments of the present invention are not limited thereto. For example, the functional configuration of the position management system 1 can differ among the fourth through sixth embodiments of the present invention. For example, the functional configurations of the respective position management systems according to the fourth through sixth embodiments of the present invention can be specialized for the corresponding embodiments of the present invention, respectively. That is, the functional configurations of the respective position management systems according to the fourth through sixth embodiments of the present invention can include only the parts/components necessary for carrying out the processes that will be described below separately for the fourth through sixth embodiments of the present invention. For example, the power control part 12 and the remaining amount measurement part 13 can be omitted from the wireless tags 10 according to the fourth and sixth embodiments of the present invention.

Process Detail of Fourth Embodiment

Next, process detail of the position management system 1 according to the fourth embodiment of the present invention will be described.

Concerning the process detail of the fourth embodiment, only differences from the first embodiment of the present invention will be described, and duplicate description will be omitted by giving the same step numbers having substantially the same process contents as those of the first embodiment.

Figure 27:
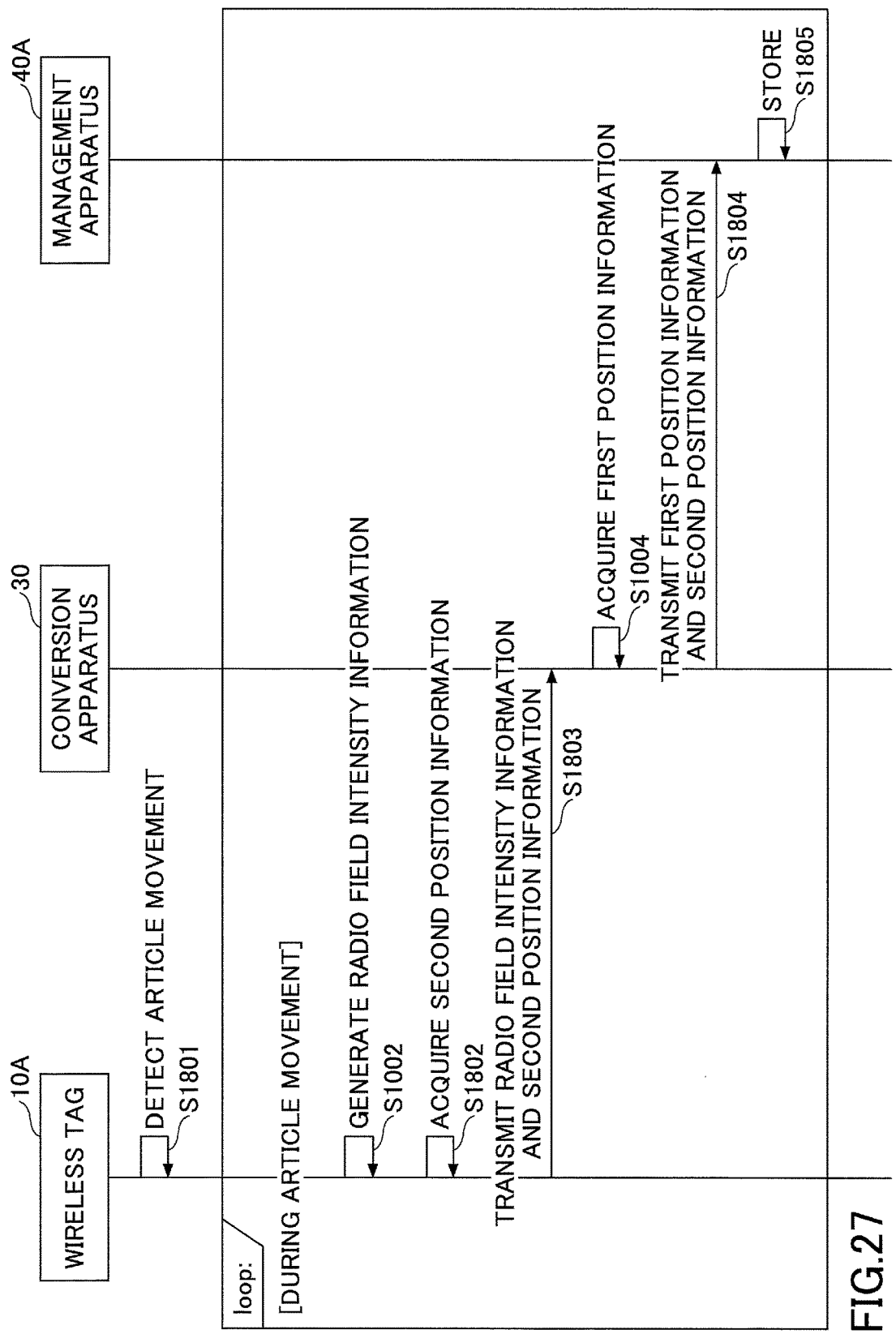
FIG. 27 is a sequence diagram of one example of a movement history information storage process according to the fourth embodiment of the present invention.

First, in the same way as that concerning the first embodiment, a process of storing the movement history information of the wireless tag 10A in the management apparatus 40A in a case where, for example, a worker in a factory, or the like, moves the article with which the wireless tag 10A is physically associated (for example, to which the wireless tag 10A is attached) will be described with reference to FIG. 27. FIG. 27 is a sequence diagram illustrating one example of the movement history information storage process according to the fourth embodiment of the present invention.

The worker, or the like, starts moving the article with which the wireless tag 10A is physically associated. As a result, the movement detection part 11 of the wireless tag 10A detects that the article starts moving (step S1801). At this time, the wireless tag 10A starts supplying power to the wireless module 105 and the IMES reception module 107 from the battery 106 in response to the detection of the movement detection part 11. Then, the wireless communications part 14 receives the radio waves of wireless communications transmitted by the wireless communications apparatus 20. Also, the IMES reception part 16 receives the radio waves in conformity to the IMES standard transmitted by the IMES transmitter 60. Thus, power is supplied to the wireless module 105 and the IMES reception module 107 of the wireless, tag 10A in response to the detection of the movement detection part 11. Therefore, power consumption in the wireless module 105 and the IMES reception module 107 can be reduced.

The IMES reception part 16 of the wireless tag 10A acquires the second position information included in the radio waves received from the IMES transmitter 60 (step S1802). Note that if the IMES reception part 16 receives a plurality of sets of the radio waves in conformity to the IMES standard from a plurality of the IMES transmitters 60, respectively, it acquires the second position information included in the set of the radio waves having the high radio field intensity (i.e., the high signal reception intensity).

The wireless communications part 14 of the wireless tag 10A transmits the radio field intensity information generated by the radio field intensity measurement part 15 and the second position information acquired by the IMES reception part 16 to the conversion apparatus 30 (step S1803). Note that the wireless communications part 14 can transmit the radio field intensity information and the second position information directly to the conversion apparatus 30, or can transmit them to the conversion apparatus 30 via one or more of the wireless communications apparatuses 20.

The network communications part 33 of the conversion apparatus 30 transmits the first position information acquired in step S1004, and the second position information received from the wireless tag 10A to the management apparatus 40A via the network N (step S1804). Thus, according to the fourth embodiment, the conversion apparatus 30 transmits the received second position information as it is to the management apparatus 40A.

Finally, in the management apparatus 40A, after the network communications part 41 receives the first position information and the second position information from the conversion apparatus 30, the information management part 42 associates the first position information and the second position information with the date and time, and stores the first position information and the second position information as the movement history information (step S1805). At this time, the date and time with which the first position information and second position information are associated can be the date and time at which the wireless tag 10A transmitted the radio field intensity information. However, embodiments of the present invention are not limited thereto. For example, the date and time at which the management apparatus 40A receives the first position information and the second position information from the conversion apparatus 30 can be associated with the first position information and the second position information, and the first position information and the second position information can be stored as the movement history information.

Note that, in step S1805, the installation area ID acquired from conversion carried out by the conversion apparatus 30 based on the apparatus ID that is included in the radio field intensity information is used as the area ID included in the first position information. However, embodiments of the present invention are not limited thereto. It is also possible to use the area ID acquired based on the second position information. In other words, the area ID of the area at which the IMES transmitter 60 is installed indicated by the second position information acquired in step S1802 can be used as the area ID included in the first position information. Thereby, it is possible to acquire the proper area ID even if the wireless tag 10A is stored (or is passing) near the boundary between the areas.

The process described above with reference to FIG. 27 is carried out at predetermined time intervals (for example, several milliseconds, several seconds, or so) while the worker or the like is moving the article with which the wireless tag 10A is physically associated. Thus, even if the article is moved to a place where the radio waves do no reach (for example, deep in a metallic shelf), the movement history information until immediately before the wireless tag 10A becomes not able to receive the radio waves is managed by the management apparatus 40A. Note that, if a predetermined period time (for example, 60 seconds) elapses in a state where the movement detection part 11 cannot detect that the article starts moving or is moving, the wireless tag 10A stops supplying power to the wireless module 105 and the IMES reception module 107 from the battery 106. As a result, for example, if the predetermined period of time elapses after the article is stopped, the IMES reception part 16 stops receiving the second position information transmitted by the IMES transmitter 60.

Figure 28:
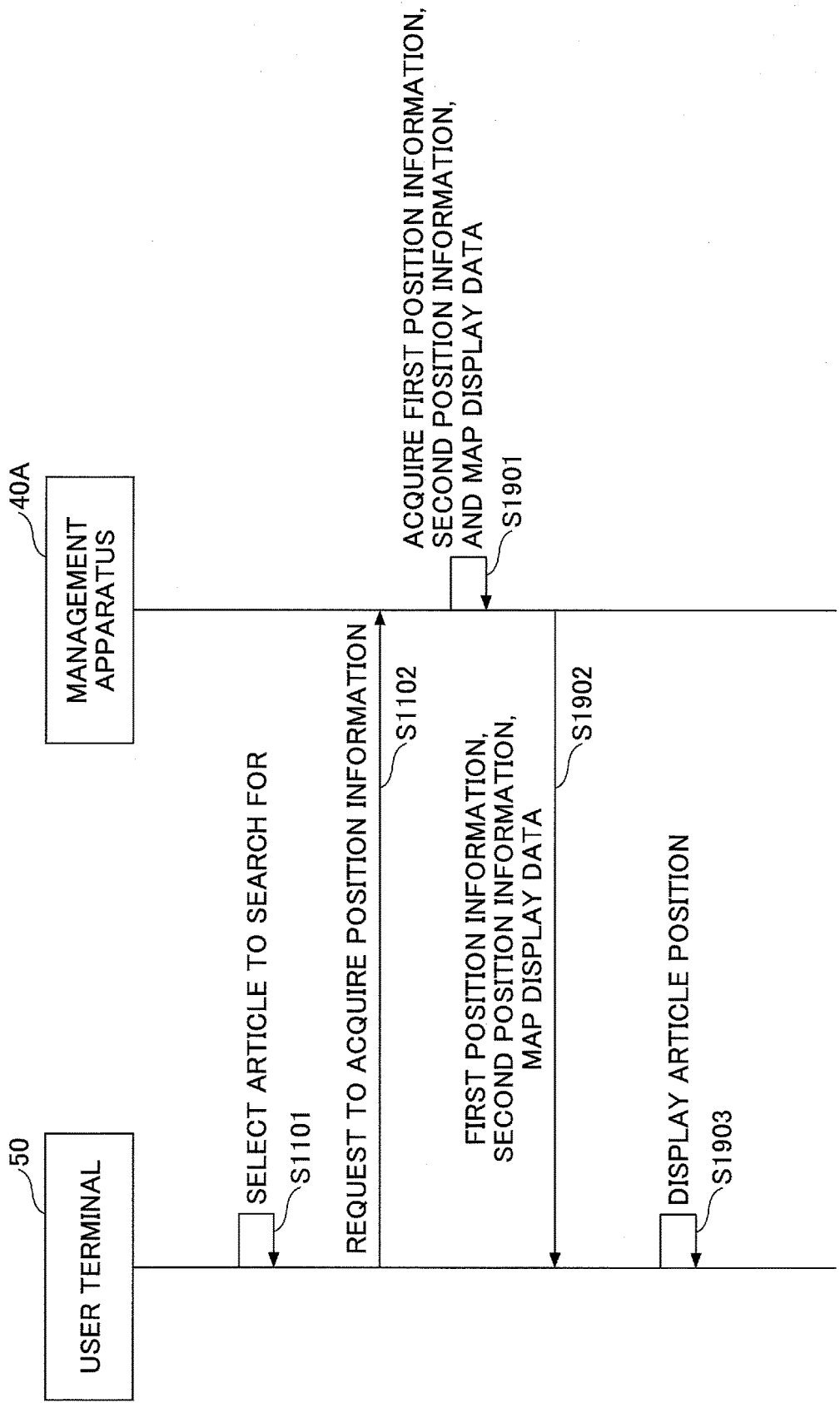
FIG. 28 is a sequence diagram of one example of a position information display process according to the fourth embodiment of the present invention.

Next, a process of the user causing the user terminal 50 to display the place where the article is stored, for example, will be described with reference to FIG. 28. FIG. 28 is a sequence diagram of one example of the position information display process according to the fourth embodiment of the present invention.

In the management apparatus 40A, after the network communications part 41 receives the position information acquisition request, the information management part 42 acquires the corresponding first position information and second position information as well as the map display data (step S1901). In other words, the information management part 42 first acquires the tag ID associated with the article name from the article information stored in the article information database 46. Next, the information management part 42 acquires the latest first position information and second position information associated with the acquired tag ID from the movement history information stored in the movement history information database 44A. Finally, the information management part 42 acquires the map display data associated with the area ID that is included in the acquired position information from the map information stored in the map information database 45. Thus, the information management part 42 acquires the latest first position information and second position information of the article having the article name selected by the user, and the map display data for displaying the map of the area.

Then, the network communications part 41 of the management apparatus 40A transmits the first position information, the second position information, and the map display data, acquired by the information management part 42, to the user terminal 50 (step S1902). Note that at this time, the network communications part 41 of the management apparatus 40A transmits the first error information that indicates the error in the first position information and the second error information that indicates the error in second position information, acquired by the information management part 42, to the user terminal 50. The first error information can be acquired as a value that is, for example, previously determined by the administrator of the position management system 1, or the like, based on the estimation accuracy of the estimation model stored in the estimation model database 35, the standards of wireless communications used by the wireless communications apparatus 20, and/or the like. The positioning error in the position information in conformity to the IMES standard can be used as the second error information.

Figure 29:
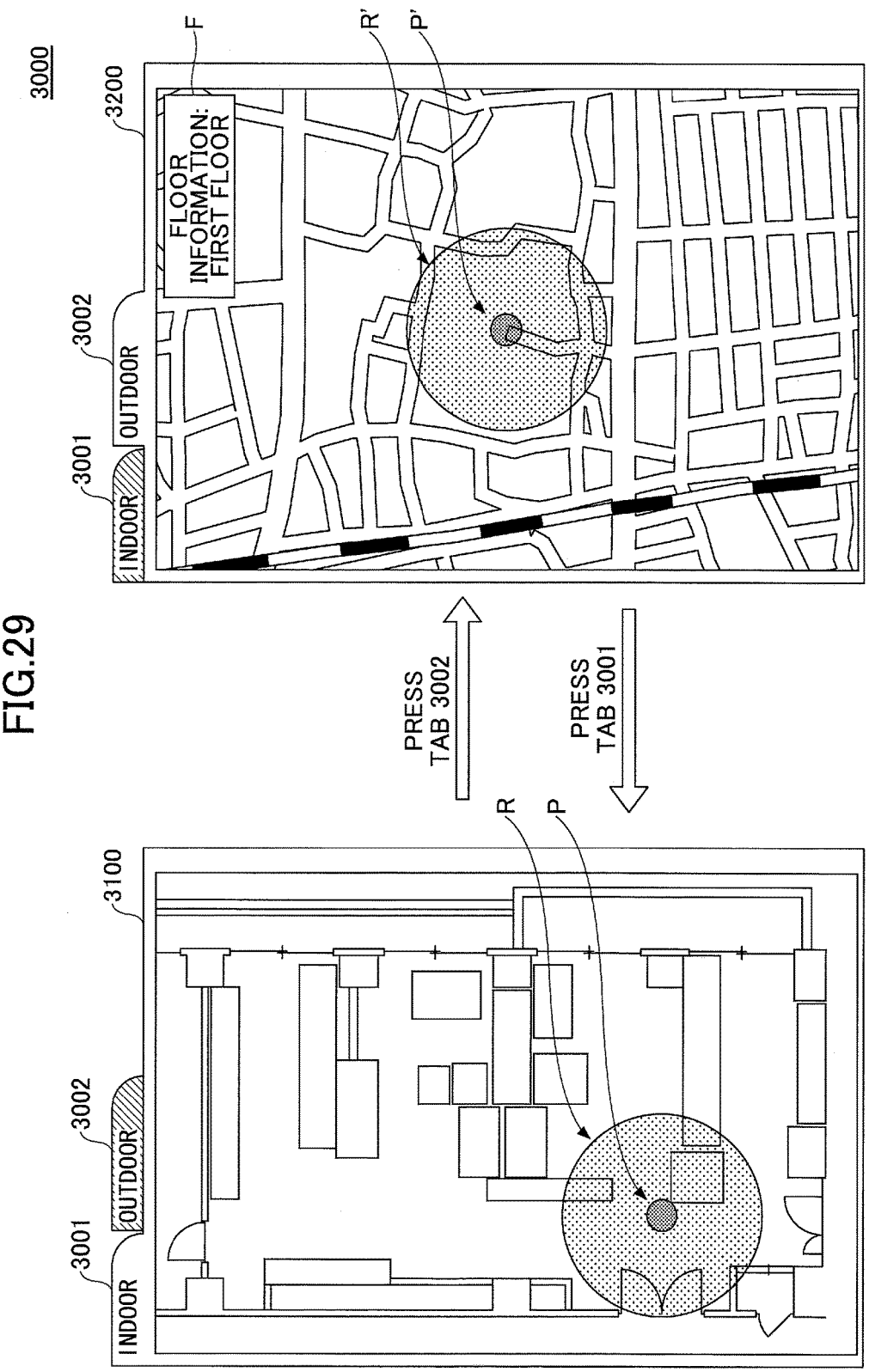
FIG. 29 illustrates one example of an article position display screen page according to the fourth embodiment of the present invention.

Finally, in the user terminal 50, after the network communications part 51 receives the first position information and the second position information as well as the map display data, the display part 53, for example, displays an article position display screen page 3000 shown in FIG. 29 on the display device 202 (step S1903). In the article position display screen page 3000 shown in FIG. 29, an indoor position display screen page 3100 and an outdoor position display screen page 3200 can be displayed while a tab 3001 and a tab 3002 are used to switch the display between these screen pages 3100 and 3200. In the indoor position display screen page 3100, in the same way as the article position display screen page 2000 shown in FIG. 15, the article's latest position based on the first position information is displayed as the position P on the displayed map based on the map display data. In the indoor position display screen page 3100, based on the first error information, the error range R that indicates the error in the position of the article is displayed. Thus, the user can know the position of the article indoors such as inside a factory displayed in the indoor map. By selecting the tab 3002 from the indoor position display screen page 3100, the user can switch the display into the outdoor position display screen page 3200.

In the outdoor position display screen page 3200, the article's latest position based on the second position information is displayed as the position P' in the map that indicates a wider range including the outdoors. Also, in the outdoor position display screen page 3200, based on the second error information, the error range R' that indicates the error in the article position is displayed. Thus, the user can know the position of the article displayed on the map of the outdoors including the outside of the factory.

Further, in the outdoor position display screen page 3200, the floor information F is displayed. Thus, the user can see which floor in the building the article is present, at the longitude and latitude, in the range indicated by the position P' with the error R'.

By selecting the tab 3001 from the outdoor position display screen page 3200, the user can switch the display into the indoor position display screen page 3100. Note that the map display data of the map displayed in the outdoor position display screen page 3200 can be acquired from, for example, an external map display data provisioning service, or can be acquired as corresponding map display data previously stored in the user terminal 50.

Thus, the position management system 1 of the fourth embodiment of the present invention manages the history of the first position information based on the radio field intensity transmitted from the wireless communications apparatus 20 and received by the wireless tag 10A and the second position information transmitted from the IMES transmitter 60 and received by the wireless tag 10A. Thus, when the user causes the user terminal 50 to display the position of the desired article, the outdoor article position such as that of the outside of the factory is displayed based on the second position information while the indoor article position such as that of the inside of the factory is displayed based on the first position information. Therefore, according to the position management system 1 in the fourth embodiment, it is possible to seamlessly switch the article position information between the indoors and the outdoors. Also, even if the article is taken outdoors, the user can cause the article position based on the second position information to be displayed.

Note that if the article with which the wireless tag 10A is physically associated is taken outdoors, the IMES reception module 107 can transmit the latitude and longitude information measured based on the radio waves received from the Global Positioning System (GPS) to the conversion apparatus 30. At this time, the wireless tag 10A can transmit the latitude and longitude information to the conversion apparatus 30 through communications, for example, in conformity to the standard such as 3rd Generation (3G), Long Term Evolution (LTE), or the like.

Process Detail of Fifth Embodiment

Next, the process detail of the position management system 1 according to the fifth embodiment of the present invention will be described.

Concerning the process detail of the fifth embodiment, only differences from the second embodiment of the present invention will be described, and duplicate description will be omitted by giving the same step numbers having substantially the same process contents as those of the second embodiment.

Figure 30:
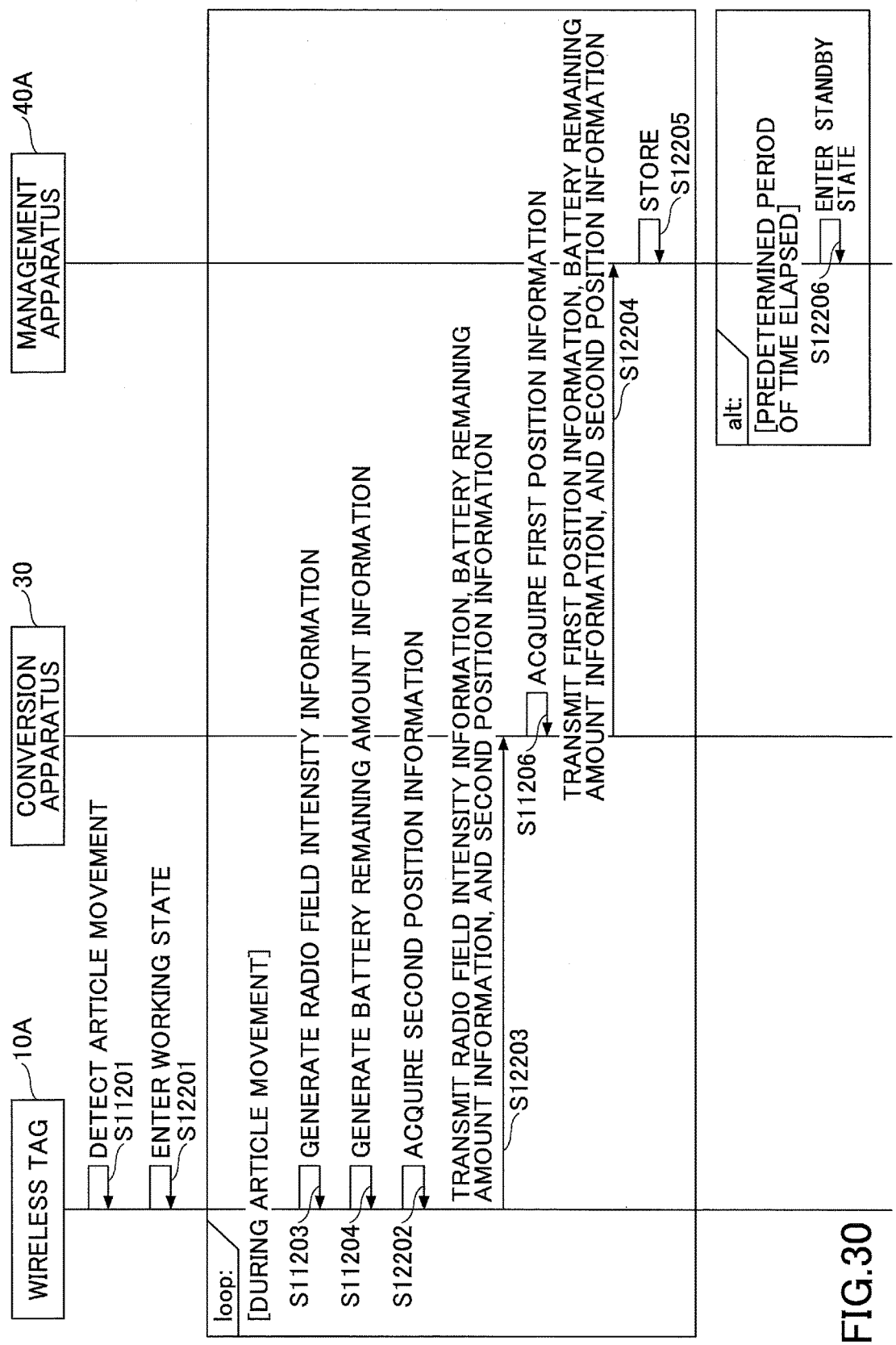
FIG. 30 is sequence diagram of one example of a movement history information and battery remaining amount information storage process according to the fifth embodiment of the present invention.

First, in the same way as the second embodiment, a process of storing the movement history information of the wireless tag 10A and the battery remaining amount information in the management apparatus 40A in a case where, for example, a worker in factory, or the like, moves the article at which the wireless tag 10A will be described with reference to FIG. 30. FIG. 30 is sequence diagram of one example of the movement history information and battery remaining amount information storage process according to the fifth embodiment of the present invention.

In the wireless tag 10A, after the movement detection part 11 detects that the article starts moving (step S11201), the power control part 12 supplies power from the battery 106 to the wireless module 105, and causes the wireless tag 10A to enter the working state (step S12201). As a result, the wireless communications part 14 of the wireless tag 10A receives the radio waves of wireless communications transmitted by the wireless communications apparatus 20. Also, the IMES reception part 16 of the wireless tag 10A receives the radio waves in conformity to the IMES standard transmitted by the IMES transmitter 60. Note that, according to the fifth embodiment, the working state of the wireless tag 10A means a state where power is being supplied to the wireless module 105 and the IMES reception module 107 from the battery 106.

Thus, the wireless tag 10A according to the fifth embodiment of the present invention starts receiving the radio waves of wireless communications by supplying power to the wireless module 105 and the IMES reception module 107 in response to the start of movement of the article with which the wireless tag 10A is physically associated.

Next, The IMES reception part 16 of the wireless tag 10A acquires the second position information that is included in the radio waves received from the IMES transmitter 60 (step S12202). Note that if the IMES reception part 16 receives a plurality of sets of the radio waves in conformity to the IMES standard from a plurality of the IMES transmitters 60, it acquires the second position information included in the set of the radio waves having the high radio field intensity (i.e., the high signal reception intensity).

The wireless communications part 14 of the wireless tag 10A transmits the radio field intensity information generated by the radio field intensity measurement part 15 and the battery remaining amount information generated by the remaining amount measurement part 13, and the second position information acquired by the IMES reception part 16 to the conversion apparatus 30 (step S12203). Note that the wireless communications part 14 can directly transmit the radio field intensity information, the battery remaining amount information, and the second position information to the conversion apparatus 30, or it can transmit the same information to the conversion apparatus 30 via one or more of the wireless communications apparatuses 20.

The network communications part 33 of the conversion apparatus 30 transmits the first position information acquired in step S11206, and the battery remaining amount information and the second position information received from the wireless tag 10A, to the management apparatus 40A via the network N (step S12204). Thus, according to the fifth embodiment, the conversion apparatus 30 transmits the received battery remaining amount information and second position information as they are to the management apparatus 40A.

Next, in the management apparatus 40A, after he network communications part 41 receives the first position information, the battery remaining amount information, and the second position information from the conversion apparatus 30, the information management part 42 associates the first position information and the second position information with the date and time, and stores the first position information and the second position information as the movement history information. Also, the information management part 42 stores the battery remaining amount information in the battery remaining amount information database 47 (step S12205).

At this time, the date and time with which the first position information and second position information are associated can be the date and time at which the wireless tags 10A transmits the radio field intensity information. However, embodiments of the present invention are not limited thereto. For example, the date and time at which the management apparatus 40A receives the first position information and the second position information from the conversion apparatus 30 can be associated with the first position information and the second position information, and the first position information and the second position information can be stored as the movement history information.

Note that, in step S12205, the installation area ID acquired from conversion carried out by the conversion apparatus 30 based on the apparatus ID that is included in the radio field intensity information is used as the area ID included in the first position information. However, embodiments of the present invention are not limited thereto. It is also possible to use the area ID acquired based on the second position information. In other words, the area ID of the area at which the IMES transmitter 60 is installed indicated by the second position information acquired in step S12202 can be used as the area ID included in the first position information. Thereby, it is possible to acquire the proper area ID even if the wireless tag 10A is stored (or is passing) near the boundary between the areas.

The process described above with reference to FIG. 30 is carried out at predetermined time intervals (for example, several milliseconds, several seconds, or so) while the worker or the like is moving the article with which the wireless tag 10A is physically associated. Thus, even if the article is moved to a place where the radio waves do no reach (for example, deep in a metallic shelf), the movement history information until immediately before the wireless tag 10A becomes not able to receive the radio waves is managed by the management apparatus 40A. However, the battery remaining amount information generation process in step S11204 can be carried out only once until the process of step S12206 that will be described later is carried out.

Finally, in the wireless tag 10A, if the movement detection part 11 cannot detect movement of the article during a predetermined period of time, the power control part 12 stops supplying power to the wireless module 105 and the IMES reception module 107 from the battery 106, and the wireless tag 10A is caused to enter the standby state (step S12206). Note that according to the fifth embodiment, the standby state of the wireless tag 10A denotes a state where no power is supplied to the wireless module 105 and the IMES reception module 107 from the battery 106.

Thus, if the predetermined period of time elapses in a state where an article with which the wireless tag 10A is physically associated has been stopped, the wireless tag 10A according to the fifth embodiment of the present invention stops supplying power to the wireless module 105 and the IMES reception module 107 from the battery 106, and stops receiving the radio waves of wireless communications. Note that the predetermined period of time can be set to be a value, for example, in a range from several seconds through several tens of seconds.

Thus, as long as the article is moving, the wireless tag 10A included in the position management system 1 of the fifth embodiment of the present invention supplies power to the wireless module 105 and the IMES reception module 107 from the battery 106. Therefore, according to the wireless tag 10A of the fifth embodiment, it is possible to reduce power consumption in the wireless module 105 and the IMES reception module 107, and it is possible to prolong the life of the battery 106.

Figure 31:
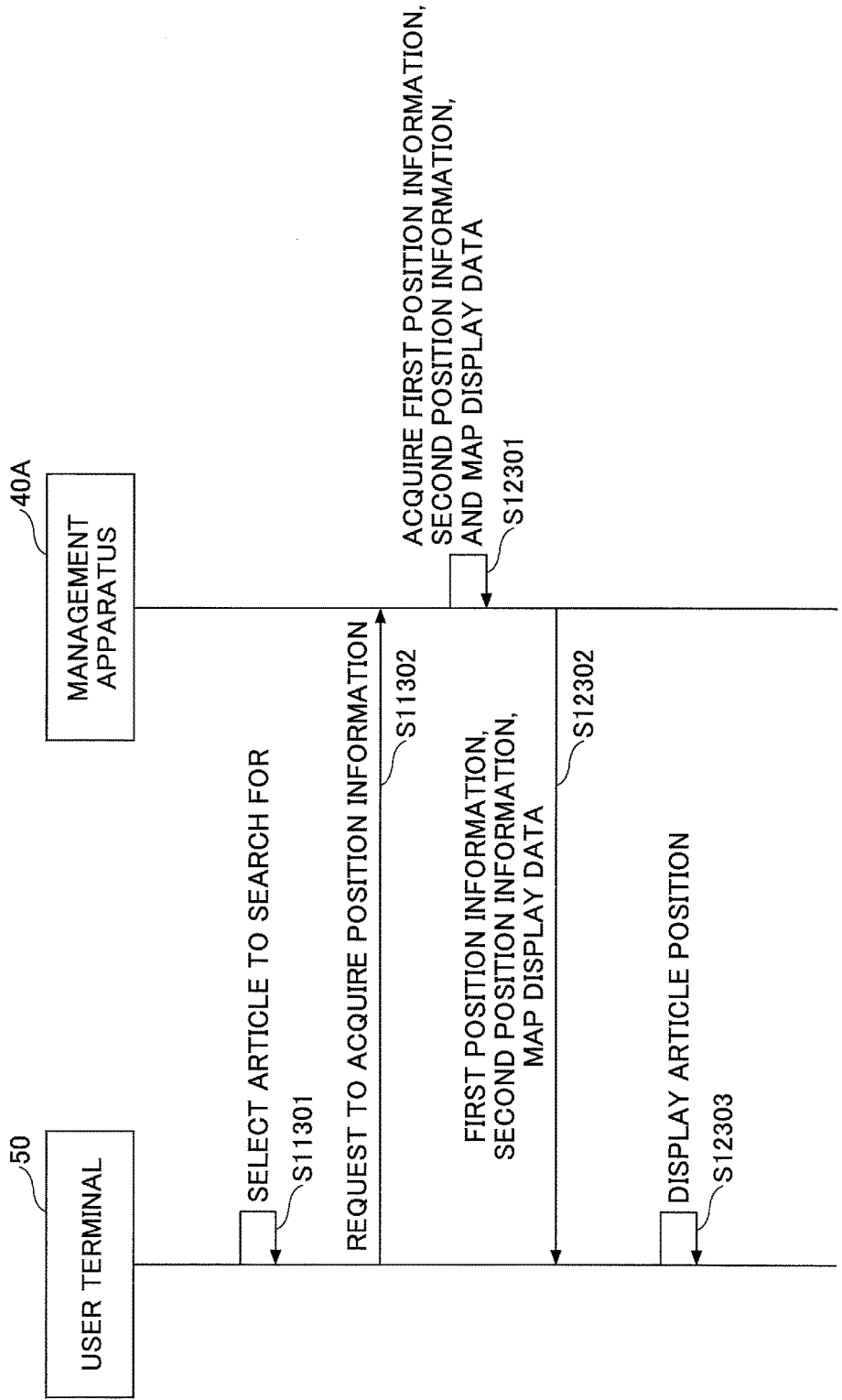
FIG. 31 is a sequence diagram of one example of a position information display process according to the fifth embodiment of the present invention.

Next, a process of the user causing the user terminal 50 to display the place where the article is stored, for example, will be described with reference to FIG. 31. FIG. 31 is a sequence diagram of one example of the position information display process according to the fifth embodiment of the present invention.

In the management apparatus 40A, after the network communications part 41 receives the position information acquisition request, the information management part 42 acquires the corresponding first position information and second position information as well as the map display data (step S12301). In other words, the information management part 42 first acquires the tag ID associated with the article name from the article information stored in the article information database 46. Next, the information management part 42 acquires the latest first position information and second position information associated with the acquired tag ID from the movement history information stored in the movement history information database 44A. Finally, the information management part 42 acquires the map display data associated with the area ID that is included in the acquired position information from the map information stored in the map information database 45. Thus, the information management part 42 acquires the latest first position information and second position information of the article having the article name selected by the user, and the map display data for displaying the map of the area.

Then, the network communications part 41 of the management apparatus 40A transmits the first position information, the second position information and the map display data, acquired by the information management part 42, to the user terminal 50 (step S12302). Note that at this time, the network communications part 41 of the management apparatus 40A transmits the first error information that indicates the error in the first position information and the second error information that indicates the error in second position information, acquired by the information management part 42, to the user terminal 50. The first error information can be acquired as a value that is, for example, previously determined by the administrator of the position management system 1, or the like, based on the estimation accuracy of the estimation model stored in the estimation model database 35, the standards of wireless communications used by the wireless communications apparatus 20, and/or the like. The positioning error in the position information in conformity to the IMES standard can be used as the second error information.

Finally, in the user terminal 50, after the network communications part 51 receives the first position information and the second position information as well as the map display data, the display part 53 displays the article position display screen page 3000 shown in FIG. 29, for example, on the display device 202 (step S12203). In the article position display screen page 3000 shown in FIG. 29, the indoor position display screen page 3100 and the outdoor position display screen page 3200 can be displayed while the tab 3001 and the tab 3002 are used to switch the display between these screen pages 3100 and 3200. In the indoor position display screen page 3100, in the same way as the article position display screen page 2000 shown in FIG. 15, the article's latest position based on the first position information is displayed as the position P on the displayed map based on the map display data. In the indoor position display screen page 3100, based on the first error information, the error range R that indicates the error in the position of the article is displayed. Thus, the user can know the position of the article indoors such as inside a factory displayed in the indoor map. By selecting the tab 3002 from the indoor position display screen page 3100, the user can switch the display into the outdoor position display screen page 3200.

In the outdoor position display screen page 3200, the article's latest position based on the second position information is displayed as the position P' in the map that indicates a wider range including the outdoors. Also, in the outdoor position display screen page 3200, based on the second error information, the error range R' that indicates the error in the article position is displayed. Thus, the user can know the position of the article displayed on the map of the outdoors including the outside of the factory.

Further, in the outdoor position display screen page 3200, the floor information F is displayed. Thus, the user can see which floor in the building the article is present, at the longitude and latitude, in the range indicated by the position P' including the error R'.

By selecting the tab 3001 from the outdoor position display screen page 3200, the user can switch the display into the indoor position display screen page 3100. Note that the map display data of the map displayed in the outdoor position display screen page 3200 can be acquired from, for example, an external map display data provisioning service, or can be acquired as corresponding map display data previously stored in the user terminal 50.

Thus, the position management system 1 of the fifth embodiment of the present invention manages the history of the first position information based on the radio field intensity transmitted from the wireless communications apparatus 20 and received by the wireless tag 10A and the second position information transmitted from the IMES transmitter 60 and received by the wireless tag 10A. Thus, when the user causes the user terminal 50 to display the position of the desired article, the outdoor article position such as that of the outside of the factory is displayed based on the second position information while the indoor article position such as that of the inside of the factory is displayed based on the first position information. Therefore, according to the position management system 1 in the fifth embodiment, it is possible to seamlessly switch the article position information between the indoors and the outdoors. Also, even if the article is taken outdoors, the user can cause the article position based on the second position information to be displayed.

Note that if the article with which the wireless tag 10A is physically associated is taken the outdoors, the IMES reception module 107 can transmit the latitude and longitude information measured based on the radio waves received from the Global Positioning System (GPS) to the conversion apparatus 30. At this time, the wireless tag 10A can transmit the latitude and longitude information to the conversion apparatus 30 through communications, for example, in conformity to the standard such as 3rd Generation (3G), Long Term Evolution (LTE), or the like.

Process Detail of Sixth Embodiment

Next, the process detail of the position management system 1 according to the sixth embodiment of the present invention will be described.

Concerning the process detail of the sixth embodiment, only differences from the third embodiment of the present invention will be described, and duplicate description will be omitted by giving the same step numbers having substantially the same process contents as those of the third embodiment.

Figure 32:
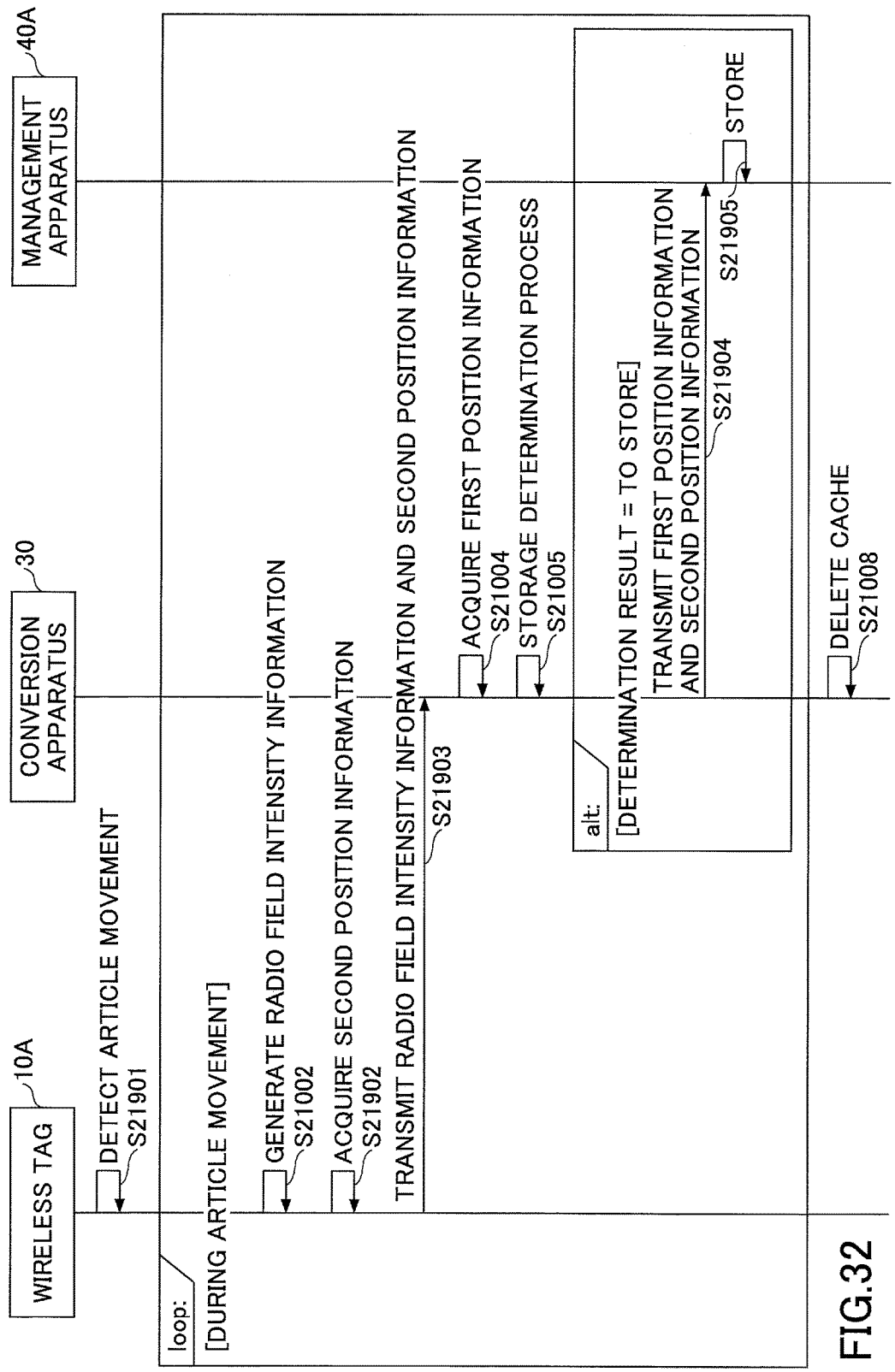
FIG. 32 is a sequence diagram of one example of a movement history information storage process according to the sixth embodiment of the present invention.

First, in the same way as that concerning the third embodiment, a process of storing the movement history information of the wireless tag 10A in the management apparatus 40A in a case where, for example, a worker in a factory, or the like, moves the article with which the wireless tag 10A is physically associated (for example, to which the wireless tag 10A is attached) will be described with reference to FIG. 32. FIG. 32 is a sequence diagram illustrating one example of the movement history information storage process according to the sixth embodiment of the present invention.

The worker, or the like, starts moving the article with which the wireless tag 10A is physically associated. As a result, the movement detection part 11 of the wireless tag 10A detects that the article starts moving (step S21901). At this time, the wireless tag 10A starts supplying power to the wireless module 105 and the IMES reception module 107 from the battery 106 in response to the detection by the movement detection part 11. The wireless communications part 14 then receives the radio waves of wireless communications transmitted from the wireless communications apparatus 20. Also, the IMES reception part 16 receives the radio waves in conformity to the IMES standard transmitted by the IMES transmitter 60. Thus, power is supplied to the wireless module 105 and the IMES reception module 107 of the wireless tag 10A in response to the detection by the movement detection part 11. As a result, it is possible to reduce power consumption in the wireless module 105 and the IMES reception module 107.

The IMES reception part 16 of the wireless tag 10A acquires the second position information included in the radio waves received from the IMES transmitter 60 (step S21902). Note that if the IMES reception part 16 receives the radio waves in conformity to the IMES standard from a plurality of the IMES transmitters 60, it acquires the second position information included in the set of the radio waves having the high radio field intensity (the high signal reception intensity).

The wireless communications part 14 of the wireless tag 10A transmits the radio field intensity information generated by the radio field intensity measurement part 15 and the second position information acquired by the IMES reception part 16 to the conversion apparatus 30 (step S21903). Note that the wireless communications part 14 can transmit the radio field intensity information and the second position information directly to the conversion apparatus 30, or can transmit them to the conversion apparatus 30 via one or more of the wireless communications apparatuses 20.

In the conversion apparatus 30, if the storage determination part 36 determines to store the first position information in the management apparatus 40A, the network communications part 33 transmits the first position information and the second position information received from the wireless tag 10A to the management apparatus 40A (in step S21904). Thus, according to the sixth embodiment, if the storage determination part 36 determines to store the first position information in the management apparatus 40A, the conversion apparatus 30 transmits the second position information received from the wireless tag 10A to the management apparatus 40A as it is.

Finally, in the management apparatus 40A, after the network communications part 41 receives the first position information and the second position information from the conversion apparatus 30, the information management part 42 associates the first position information and the second position information with the date and time, and stores the first position information and the second position information as the movement history information (step S21905). At this time, the date and time with which the first position information and second position information are associated can be the date and time at which the wireless tag 10A generates the radio field intensity information. However, embodiments of the present invention are not limited thereto. For example, the date and time at which the management apparatus 40A receives the first position information and the second position information from the conversion apparatus 30 can be associated with the first position information and the second position information, and the first position information and the second position information can be stored as the movement history information.

Note that, in step S21905, the installation area ID acquired from conversion carried out by the conversion apparatus 30 based on the apparatus ID that is included in the radio field intensity information is used as the area ID included in the first position information. However, embodiments of the present invention are not limited thereto. It is also possible to use the area ID acquired based on the second position information. In other words, the area ID of the area at which the IMES transmitter 60 is installed indicated by the second position information acquired in step S21902 can be used as the area ID included in the first position information. Thereby, it is possible to acquire the proper area ID even if the wireless tag 10A is stored (or is passing) near the boundary between the areas.

The process described above with reference to FIG. 32 is carried out at predetermined time intervals (for example, several milliseconds, several seconds, or so) while the worker or the like is moving the article with which the wireless tag 10A is physically associated. Thus, even if the article is moved to a place where the radio waves do no reach (for example, deep in a metallic shelf), the movement history information until immediately before the wireless tag 10A becomes not able to receive the radio waves is managed by the management apparatus 40A. Note that, if a predetermined period time (for example, 60 seconds) elapses in a state where the movement detection part 11 cannot detect that the article starts moving or is moving, the wireless tag 10A stops supplying power to the wireless module 105 and the IMES reception module 107 from the battery 106. As a result, for example, if the predetermined period of time elapses after the article is stopped, the IMES reception part 16 stops receiving the second position information transmitted by the IMES transmitter 60.

Next, a process of the user causing the user terminal 50 to display the place where the article is stored will be described with reference to FIG. 33. FIG. 33 is a sequence diagram of one example of the position information display process according to the sixth embodiment of the present invention.

In the management apparatus 40A, after the network communications part 41 receives the position information acquisition request, the information management part 42 acquires the corresponding first position information and second position information as well as the map display data (step S22001). In other words, the information management part 42 first acquires the tag ID associated with the article name from the article information stored in the article information database 46. Next, the information management part 42 acquires the latest first position information and second position information associated with the acquired tag ID from the movement history information stored in the movement history information database 44A. Finally, the information management part 42 acquires the map display data associated with the area ID that is included in the acquired position information from the map information stored in the map information database 45. Thus, the information management part 42 acquires the latest first position information and second position information of the article having the article name selected by the user, and the map display data for displaying the map of the area.

Then, the network communications part 41 of the management apparatus 40A transmits the first position information, the second position information and the map display data, acquired by the information management part 42, to the user terminal 50 (step S22002). Note that at this time, the network communications part 41 of the management apparatus 40A transmits the first error information that indicates the error in the first position information and the second error information that indicates the error in second position information, acquired by the information management part 42, to the user terminal 50. The first error information can be acquired as a value that is, for example, previously determined by the administrator of the position management system 1, or the like, based on the estimation accuracy of the estimation model stored in the estimation model database 35, the standards of wireless communications used by the wireless communications apparatus 20, and/or the like. Also, the positioning error in the position information in conformity to the IMES standard can be used as the second error information.

Finally, in the user terminal 50, after the network communications part 51 receives the first position information and the second position information as well as the map display data, the display part 53 displays the article position display screen page 3000, for example, shown in FIG. 29, on the display device 202 (step S21903). In the article position display screen page 3000 shown in FIG. 29, the indoor position display screen page 3100 and the outdoor position display screen page 3200 can be displayed while the tab 3001 and the tab 3002 are used to switch the display between these screen pages 3100 and 3200. In the indoor position display screen page 3100, in the same way as the article position display screen page 2000 shown in FIG. 15, the article's latest position based on the first position information is displayed as the position P on the displayed map based on the map display data. In the indoor position display screen page 3100, based on the first error information, the error range R that indicates the error in the position of the article is displayed. Thus, the user can see the position of the article indoors such as inside a factory displayed in the indoor map. By selecting the tab 3002 from the indoor position display screen page 3100, the user can switch the display into the outdoor position display screen page 3200.

In the outdoor position display screen page 3200, the article's latest position based on the second position information is displayed as the position P' in the map that indicates a wider range including the outdoors. Also, in the outdoor position display screen page 3200, based on the second error information, the error range R' that indicates the error in the article position is displayed. Thus, the user can see the position of the article displayed on the map of the outdoors including the outside of the factory.

Further, in the outdoor position display screen page 3200, the floor information F is displayed. Thus, the user can see which floor in the building the article is present, at the longitude and latitude, in the range indicated by the position P' including the error R'.

By selecting the tab 3001 from the outdoor position display screen page 3200, the user can switch the display into the indoor position display screen page 3100. Note that the map display data of the map displayed in the outdoor position display screen page 3200 can be acquired from, for example, an external map display data provisioning service, or can be acquired as corresponding map display data previously stored in the user terminal 50.

Thus, the position management system 1 of the sixth embodiment of the present invention manages the history of the first position information based on the radio field intensity transmitted from the wireless communications apparatus 20 and received by the wireless tag 10A and the second position information transmitted from the IMES transmitter 60 and received by the wireless tag 10A. Thus, when the user causes the user terminal 50 to display the position of the desired article, the outdoor article position such as that of the outside of the factory is displayed based on the second position information while the indoor article position such as that of the inside of the factory is displayed based on the first position information. Therefore, according to the position management system 1 in the sixth embodiment, it is possible to seamlessly switch the article position information between the indoors and the outdoors. Also, even if the article is taken outdoors, the user can cause the article position based on the second position information to be displayed.

Note that if the article with which the wireless tag 10A is physically associated is taken outdoors, the IMES reception module 107 can transmit the latitude and longitude information measured based on the radio waves received from the Global Positioning System (GPS) to the conversion apparatus 30. At this time, the wireless tag 10A can transmit the latitude and longitude information to the conversion apparatus 30 through communications, for example, in conformity to the standard such as 3rd Generation (3G), Long Term Evolution (LTE), or the like.

Thus, the position management systems, the position management apparatuses, the position management methods, and the non-transitory computer-readable information recording media have been described in the embodiments of the present invention. However, embodiments of the present invention are not limited to the above-described embodiments of the present invention, and various modifications and replacements can be made.

What is claimed is:

1. A position management system which manages position information of a second apparatus that carries out wireless communications with a first apparatus installed indoors, the position management system comprising: at least one processor that is configured to: determine radio field intensity of radio waves of the wireless communications received from the first apparatus when movement of the second apparatus is detected, acquire first position information that indicates a position of the second apparatus estimated based on the determined radio field intensity of the radio waves, and cause the acquired first position information to be stored and associated with time information, and an Indoor Messaging System (IMES) transmission apparatus that transmits latitude and longitude information in conformity to an IMES standard, wherein the at least one processor is further configured to: cause the position management system to receive second information that includes the latitude and longitude information from the IMES transmission apparatus if the movement of the second apparatus is detected, cause the first position information and the second position information to be stored and associated with time information, cause the position management system to transmit the first position information and the second position information to a terminal apparatus in response to a request from the terminal apparatus connected with the position management system via a network, and display a position based on the first position information or the second position information on the terminal apparatus, and cause the position management system to transmit the first position information, the second position information, first error information that indicates an error in the first position information and second error information that indicates an error in the second position information to the terminal apparatus, and display the position based on the first position information or the second position information and also an error based on the first error information or the second error information on the terminal apparatus.

2. The position management system as claimed in claim 1, wherein
the at least one processor is further configured to:
estimate the position of the second apparatus based on a previously generated radio field intensity distance attenuation model and the determined radio field intensity of the radio waves, and acquire the first position information.

3. The position management system as claimed in claim 1, wherein
the at least one processor is further configured to:
cause the first position to be stored in an external storage area connected to the position management system via a network.

4. The position management system as claimed in claim 1, wherein
the radio waves of the wireless communications received from the first apparatus are radio waves in conformity to a standard of ZigBee, Bluetooth, RFID, or infrared rays.

5. The position management system as claimed in claim 1, wherein
the at least one processor is further configured to:
cause the position management system to transmit the first position information to a terminal apparatus in response to a request from the terminal apparatus connected with the position management system via a network, and display a position based on the first position information on the terminal apparatus.

6. The position management system as claimed in claim 5, wherein
the at least one processor is further configured to:
cause the position management system to transmit the first position information as well as error information that indicates an error in the first position information to the terminal apparatus, and display the position based on the first position information as well as an error based on the error information on the terminal apparatus.

7. The position management system as claimed in claim 1, wherein
the at least one processor is further configured to:
cause the position management system to stop reception of the radio waves of the wireless communications if movement of the second apparatus is not detected for a predetermined period of time.

8. The position management system as claimed in claim 1, wherein
the at least one processor is further configured to:
cause the position management system to stop reception of the second information if movement of the second apparatus is not detected for a predetermined period of time.

9. The position management system as claimed in claim 1, wherein
the second apparatus is a wireless tag physically associated with a predetermined article.

10. The position management system as claimed in claim 1, wherein
the at least one processor is further configured to:
cause the second apparatus to enter a working state, in which power is supplied to the second apparatus when movement of the second apparatus is detected,
determine the radio field intensity of radio waves of the wireless communications transmitted from the first apparatus when the second apparatus enters the working state,
acquire the first position information that indicates a position of the second apparatus estimated based on the determined radio field intensity of the radio waves,
cause the acquired first position information to be stored and associated with the time information, and
cause the second apparatus to enter a standby state, in which a power supply amount is less than that in the working state, when movement of the second apparatus is not detected for a predetermined period of time after the second apparatus enters the working state.

11. The position management system as claimed in claim 1, wherein
the at least one processor is further configured to:
determine whether previously stored first position information and currently acquired first position information satisfy a predetermined relationship,
cause the currently acquired position information to be stored and associated with the time information, if the at least one processor determines that the previously stored first position information and the currently acquired first position information satisfy the predetermined relationship, and
update the previously stored first position information with the currently acquired first position information, if the at least one processor determines that the previously stored first position information and the currently acquired first position information satisfy the predetermined relationship.

12. The position management system as claimed in claim 11, wherein
the at least one processor is further configured to:
delete the previously stored first position information if the currently acquired first position information is not acquired for a predetermined period time.

13. The position management system as claimed in claim 11, wherein
the predetermined relationship is a relationship in which a distance between a position indicated by the previously stored first position information and a position indicated by the currently acquired first position information falls within a predetermined range.

14. The position management system as claimed in claim 11, wherein
the predetermined relationship is a relationship in which a distance between a position indicated by the previously stored first position information and a position indicated by the currently acquired first position information is greater than or equal to a predetermined distance.

15. A position management apparatus which manages position information of a second apparatus that carries out wireless communications with a first apparatus installed indoors, the information management apparatus comprising—at least one processor that is configured to: determine radio field intensity of radio waves of the wireless communications received from the first apparatus when movement of the second apparatus is detected, acquire first position information that indicates a position of the second apparatus estimated based on the determined radio field intensity of the radio waves, and cause the acquired first position information to be stored and associated with time information, and an IMES transmission apparatus that transmits latitude and longitude information in conformity to an Indoor Messaging System (IMES) IMES standard, wherein the at least one processor is further configured to: cause the position management system to receive second information that includes the latitude and longitude information from the IMES transmission apparatus if the movement of the second apparatus is detected, cause the first position information and the second position information to be stored and associated with time information, cause the position management system to transmit the first position information and the second position information to a terminal apparatus in response to a request from the terminal apparatus connected with the position management system via a network, and display a position based on the first position information or the second position information on the terminal apparatus, and cause the position management system to transmit the first position information, the second position information, first error information that indicates an error in the first position information and second error information that indicates an error in the second position information to the terminal apparatus, and display the position based on the first position information or the second position information and also an error based on the first error information or the second error information on the terminal apparatus.

16. A position management method for managing position information of a second apparatus that carries out wireless communications with a first apparatus installed indoors, the information management method comprising: determining radio field intensity of radio waves of the wireless communications received from the first apparatus when movement of the second apparatus is detected by at least one processor, acquiring first position information that indicates a position of the second apparatus estimated based on the determined radio field intensity of the radio waves by at least one processor, and causing the acquired first position information to be stored and associated with time information by at least one processor, transmitting, by an Indoor Messaging System (IMES) IMES transmission apparatus, latitude and longitude information in conformity to an IMES standard, receiving second information that includes the latitude and longitude information from the IMES transmission apparatus if the movement of the second apparatus is detected, causing the first position information and the second position information to be stored and associated with time information, transmitting the first position information and the second position information to a terminal apparatus in response to a request from the terminal apparatus connected with the position management system via a network, and displaying a position based on the first position information or the second position information on the terminal apparatus, and transmitting the first position information, the second position information, first error information that indicates an error in the first position information and second error information that indicates an error in the second position information to the terminal apparatus, and displaying the position based on the first position information or the second position information and also an error based on the first error information or the second error information on the terminal apparatus.

17. A non-transitory computer-readable information recording medium storing computer-executable instructions that, when executed by at least one processor, implement the position management method claimed in claim 16.

\* \* \* \* \*